US012769268B2

(12) United States Patent
Inoue et al.

(10) Patent No.: US 12,769,268 B2
(45) Date of Patent: Oct. 20, 2026

(54) CONTROL SYSTEM, CONTROL DEVICE, CONTROL METHOD, AND COMPUTER-READABLE RECORDING MEDIUM STORING CONTROL PROGRAM

(71) Applicant: Fujitsu Limited, Kawasaki (JP)

(72) Inventors: Koki Inoue, Yokohama (JP); Kenji Taka, Kawasaki (JP); Takayoshi Nakayama, Kawasaki (JP); Shinya Fukuzaki, Shizuoka (JP); Satoshi Itaya, Shizuoka (JP); Naofumi Otsuki, Yokohama (JP); Wataru Fukumoto, Yokohama (JP); Tomomi Usui, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 492 days.

(21) Appl. No.: 18/338,544

(22) Filed: Jun. 21, 2023

(65) Prior Publication Data

US 2024/0111262 A1 Apr. 4, 2024

(30) Foreign Application Priority Data

Sep. 30, 2022 (JP) ................................ 2022-158456

(51) Int. Cl.
*G05B 15/02* (2006.01)

(52) U.S. Cl.
CPC .................................... *G05B 15/02* (2013.01)

(58) Field of Classification Search
CPC ............................ G05B 15/02; H04L 67/1042
See application file for complete search history.

(56) References Cited

U.S. PATENT DOCUMENTS 10,021,025 B2 7/2018 Beshai
10,291,510 B2 5/2019 Xuan et al.
11,088,937 B1 * 8/2021 Zhou ....................... H04L 45/26
(Continued)

FOREIGN PATENT DOCUMENTS

JP 2018-005301 1/2018
WO 2018/216206 11/2018

OTHER PUBLICATIONS

EESR—Extended European Search Report mailed on Feb. 1, 2024 for corresponding European Patent Application No. 23181725.5 [7 pages].

*Primary Examiner* — Charles R Kasenge
(74) *Attorney, Agent, or Firm* — Fujitsu Intellectual Property Center

(57) ABSTRACT

A system including control devices configured to perform nth-order transmission, each control device including: a storage device storing, in relation to the control devices, a source list being a list of the control devices to be passed through from a most upstream control device to the control device and a destination list being a list of the control devices to be passed through from the control device to a most downstream control device; and a processor performing processing including: when an update request including a first source list of a first control device is received, updating the source list using the update request, generating a new update request using the updated source list, and transmitting the new update request to a second control device; and when a completion response including a second destination list of the second control device is received, updating the destination list using the completion response.

7 Claims, 49 Drawing Sheets

(56) References Cited

U.S. PATENT DOCUMENTS

| | | | |
|---|---|---|---|
| 2008/0031130 A1 | 2/2008 | Raj et al. | |
| 2018/0324067 A1* | 11/2018 | Okayama | G06F 11/3058 |
| 2020/0201990 A1 | 6/2020 | Hamamoto et al. | |
| 2021/0067438 A1 | 3/2021 | Radhakrishnan | |

* cited by examiner

FIG. 44

50i

| DATA ID | DISTRIBUTION SOURCE LIST $src_i$ | DISTRIBUTION DESTINATION LIST $dst_i$ |
|---|---|---|
| aaaa | {[100A,100B]} | {[100D,100E]} |
| bbbb | {ϕ} | {[100A,100B,100E]} |
| cccc | {[100A]} | {[100B,100D],[100B,100E,100F]} |
| ... | ... | ... |

CONTROL SYSTEM, CONTROL DEVICE, CONTROL METHOD, AND COMPUTER-READABLE RECORDING MEDIUM STORING CONTROL PROGRAM

CROSS-REFERENCE TO RELATED APPLICATION

This application is based upon and claims the benefit of priority of the prior Japanese Patent Application No. 2022-158456, filed on Sep. 30, 2022, the entire contents of which are incorporated herein by reference.

FIELD

The embodiment discussed herein is related to a control system and the like.

BACKGROUND

There is an increasing need to distribute and utilize data between organizations. In particular, in order to promote quick and flexible data utilization when a plurality of organizations cooperates in a chained and hierarchical manner, it is desirable that each organization not only requests an organization as a data generation source to provide data but also performs nth-order transmission of the data.

FIG. 46 is a diagram for explaining the nth-order transmission. Primary to tertiary transmission will be described in the description of FIG. 46. Furthermore, terminal devices used by first to fourth organizations will be described as nodes A, B, C, and D, respectively. In the primary transmission, the node A transmits data X to the node B. In the secondary transmission, the node B transmits the data X received from the node A to the node C. In the tertiary transmission, the node C transmits the data X received from the node B to the node D.

For example, it is inefficient for the most upstream node A to exchange data with the remaining nodes B to D one by one, and the load is concentrated on the node A. On the other hand, according to the nth-order transmission illustrated in FIG. 46, no load is concentrated on a specific node, and data may be efficiently provided.

Japanese Laid-open Patent Publication No. 2018-005301 and International Publication Pamphlet No. WO 2018/216206 are disclosed as related art.

SUMMARY

According to an aspect of the embodiments, there is provided a control system including a plurality of control devices configured to perform nth-order transmission, wherein each control device of the plurality of control devices includes: a storage device configured to store, in relation to the plurality of control devices, a distribution source list that stores a list of the plurality of control devices to be passed through from a most upstream control device to the control device and a distribution destination list that stores a list of the plurality of control devices to be passed through from the control device to a most downstream control device; and a processor coupled to the storage device, the processor being configured to perform control processing including: in a case where an update request in which a first distribution source list of a first control device being any one of the plurality of control devices is set is received, updating the distribution source list based on the update request, generating a new update request based on the updated distribution source list, and transmitting the new update request to a second control device being any one of the plurality of control devices other than the first control device; and in a case where an update completion response in which a second distribution destination list of the second control device is set is received from the second control device, updating the distribution destination list based on the update completion response.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 44 is a diagram illustrating an exemplary data structure of management information;

DESCRIPTION OF EMBODIMENTS

Figure 47:
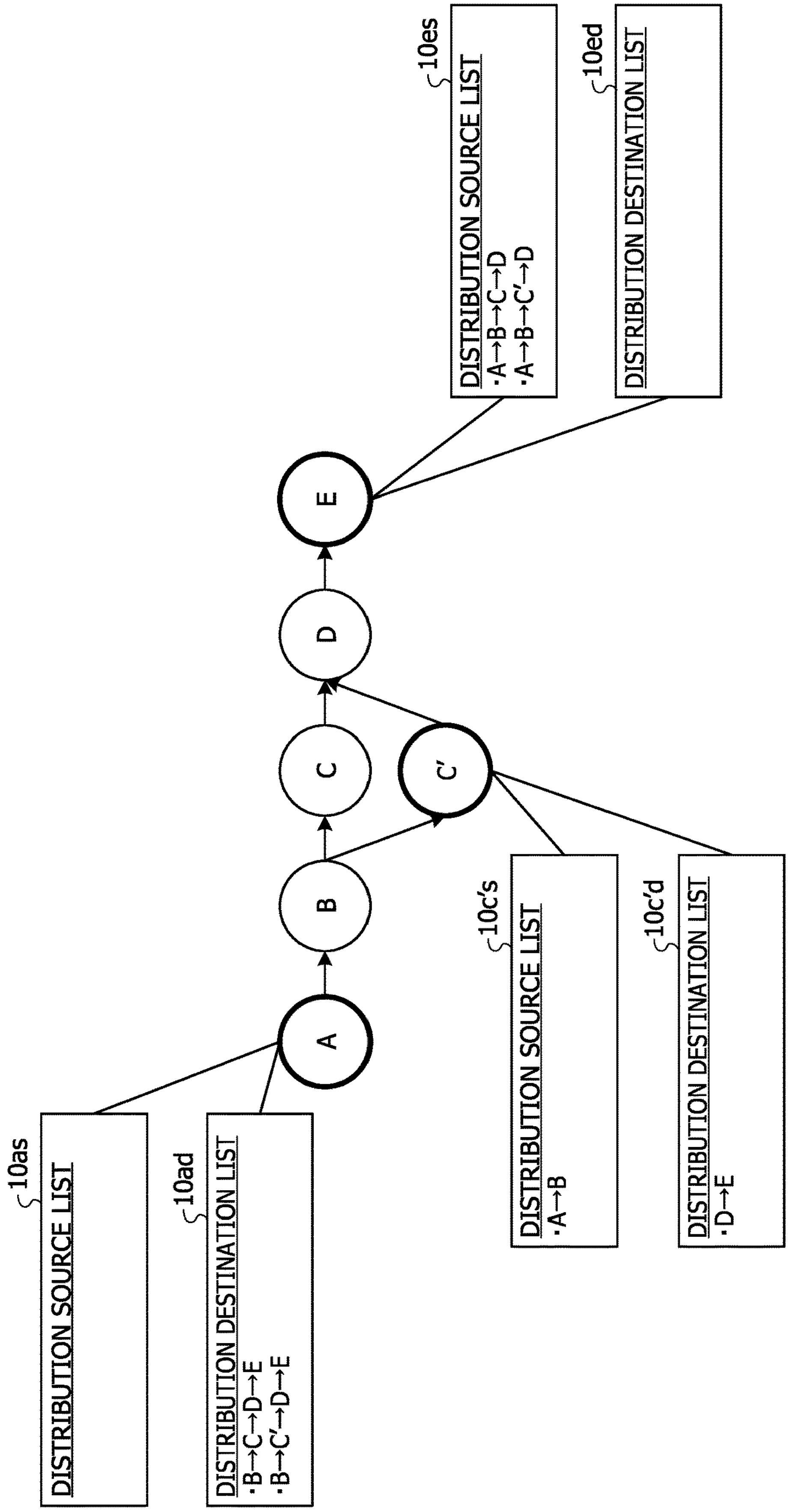
FIG. 47 is a diagram (1) for explaining a function needed in the nth-order transmission.
Figure 48:
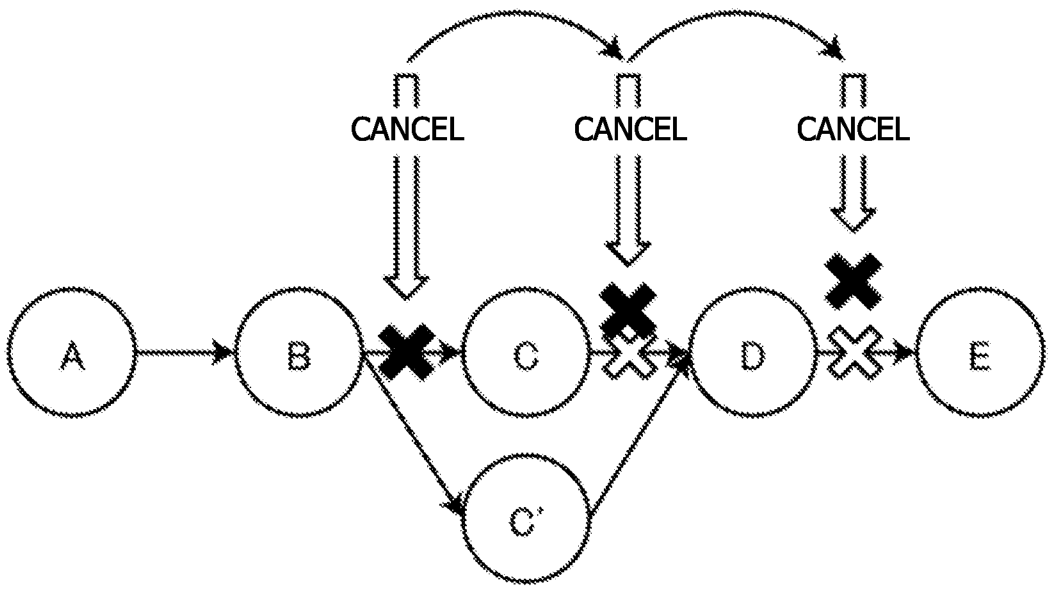
FIG. 48 is a diagram (2) for explaining the function needed in the nth-order transmission.

A function needed in the nth-order transmission described in the related art will be described. FIGS. 47 and 48 are diagrams for explaining the function needed in the nth-order transmission. Functions (1) and (2) needed in the nth-order transmission will be described with reference to FIG. 47. A function (3) needed in the nth-order transmission will be described with reference to FIG. 48. In FIGS. 47 and 48, terminal devices used by first to sixth organizations will be described as nodes A, B, C, C', D, and E, respectively. It is assumed that data transmission destinations of the nodes A to E are set in advance. For example, the node A transmits data to the node B. The node B transmits the data to the node C or to the node C'. The node C transmits the data to the node D. The node C' transmits the data to the node D. The node D transmits the data to the node E.

FIG. 47 will be described. The function (1) needed in the nth-order transmission is a function in which a transmission destination node (node that has received data) is enabled to grasp a route through which the data has been distributed (list of nodes involved in transmission: distribution source list). The route is indicated using a right arrow "→". For example, n1→n2→n3 indicates that the data route is a route that sequentially passes a node n1, a node n2, and a node n3.

For example, according to the function (1), a distribution source list 10*as* is set in the node A, a distribution source list 10*c*'s is set in the node C', and a distribution source list 10*es* is set in the node E. Description of distribution source lists of other nodes will be omitted. Since the node A is the most upstream node, the distribution source list 10*as* is an empty set. "A→B" is set in the distribution source list 10*c*'s. "A→B→C→D" and "A→B→C'→D" are set in the distribution source list 10*es*.

The function (2) needed in the nth-order transmission is a function in which, in a case where data transmitted from a transmission source node to an adjacent node is transmitted to another node, a route thereof (list of nodes involved in transmission: distribution destination list) may be grasped.

For example, according to the function (2), a distribution destination list 10*ad* is set in the node A, a distribution destination list 10*c*'d is set in the node C', and a distribution destination list 10*ed* is set in the node E. Description of distribution destination lists of other nodes will be omitted. "B→C→D→E" and "B→C'→D→E" are set in the distribution destination list 10*ad*. "D→E" is set in the distribution destination list 10*c*'d. Since the node E is the most downstream node, the distribution destination list 10*ed* is an empty set.

FIG. 48 will be described. The function (3) needed in the nth-order transmission is a function in which a node is enabled to cancel data transmission. According to the function (3), in a case where a node cancels transmission and the transmission destination node has transmitted the corresponding data to another node, subsequent transmission is also canceled in a chained manner. For example, in a case where the node B cancels transmission of the data X to the node C, it means that the transmission from the node C to the node D and the transmission from the node D to the node E are canceled with respect to the transmission of the data X. When data transmission cancellation occurs, the distribution destination list and the distribution source list are updated according to the transmission cancellation.

However, in the existing nth-order transmission in which each node transmits and receives data in an autonomously distributed manner, the functions (1) to (3) described above are not provided, and each node may not correctly grasp the data distribution source and the data distribution destination. Furthermore, when data transmission cancellation occurs, each node may not update the distribution source list and the distribution destination list.

Figure 49:
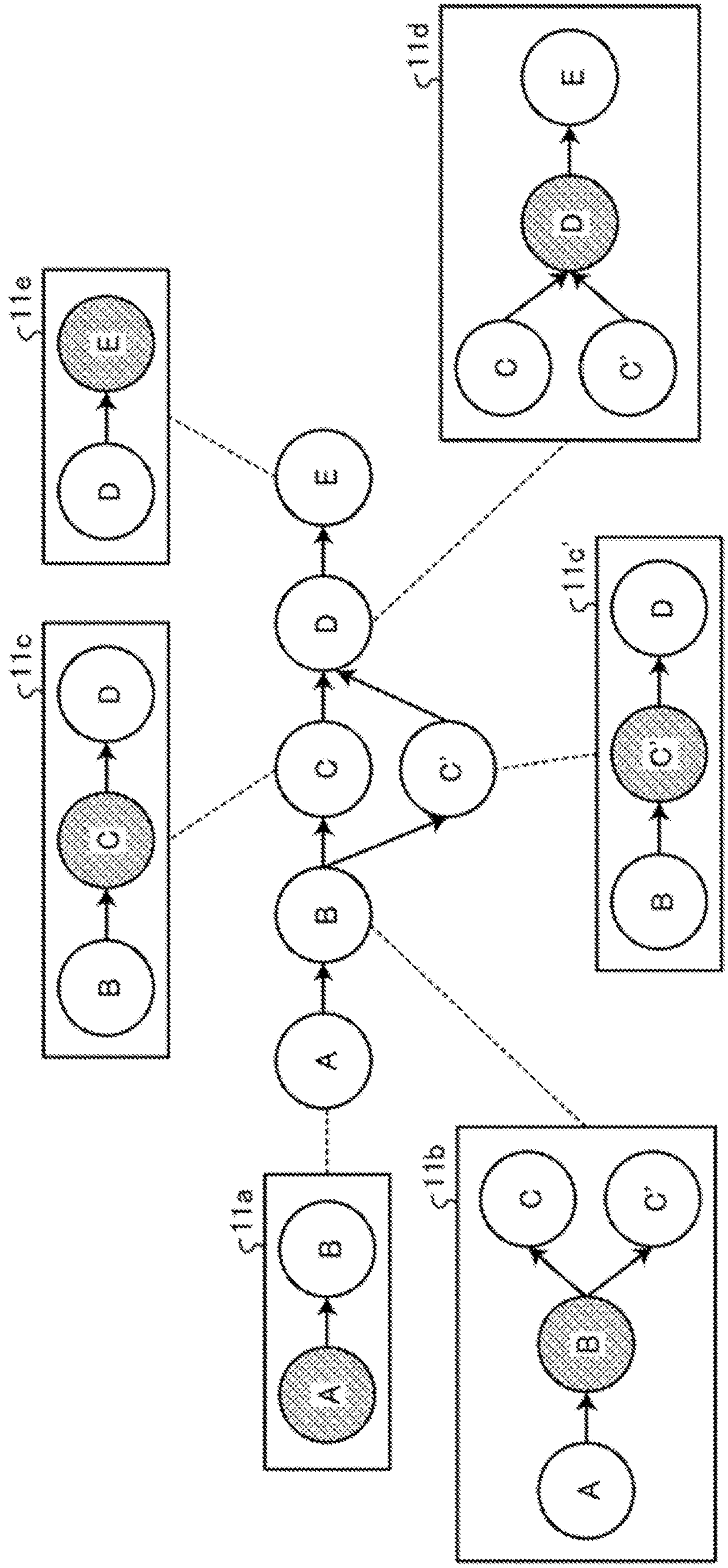
FIG. 49 is a diagram for explaining a problem of an existing technique.

FIG. 49 is a diagram for explaining a problem of an existing technique. A distribution destination and a distribution source that may be independently grasped by each node are only nodes that have directly transmitted and received data. For example, a viewpoint of the node A is a viewpoint 11*a*. The node A grasps only the transmission destination node B. A viewpoint of the node B is a viewpoint 11*b*. The node B grasps the transmission source node A, and the transmission destination nodes C and C'.

A viewpoint of the node C is a viewpoint 11*c*. The node C grasps the transmission source node B, and the transmission destination node D. A viewpoint of the node C' is a viewpoint 11*c*'. The node C' grasps the transmission source node B, and the transmission destination node D. A viewpoint of the node D is a viewpoint 11*d*. The node D grasps the transmission source nodes C and C', and the transmission destination node E. A viewpoint of the node E is a viewpoint 11*e*. The node E grasps the transmission source node D.

For example, while the node A desires to grasp information regarding the distribution destination list 10*ad* described in FIG. 47, it may grasp only up to the transmission destination node B.

While the node C desires to grasp the distribution source "A→B" before the node B and the distribution destination "D→E" after D, it may grasp only up to the node B as the distribution source and the node D as the distribution destination. Note that the node C is not to grasp the distribution route "B→C'→D→E" that the node C is not involved in.

In other words, in the nth-order transmission in which each node transmits and receives data in an autonomously distributed manner, each node needs to correctly grasp the data distribution source and the data distribution destination.

In one aspect, an object of the embodiment is to provide a control system, a control device, a control method, and a control program that enable each node to correctly grasp a data distribution source and a data distribution destination in nth-order transmission.

Hereinafter, an embodiment of a control system, a control device, a control method, and a control program disclosed in the present application will be described in detail with reference to the drawings. Note that the disclosure is not limited by the embodiment.

[Embodiment]

Figure 1:
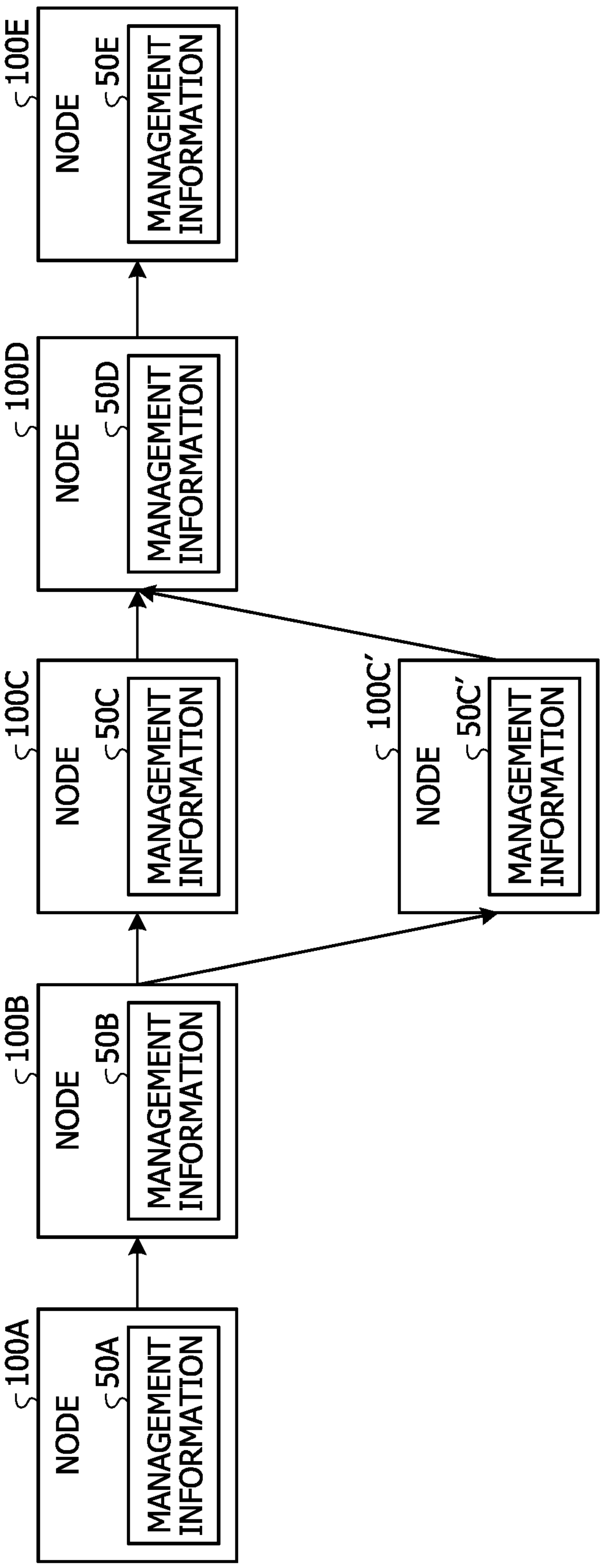
FIG. 1 is a diagram illustrating a control system according to the present embodiment.

An exemplary control system according to the present embodiment will be described. FIG. 1 is a diagram illustrating the control system according to the present embodiment. As illustrated in FIG. 1, the control system includes nodes 100A, 100B, 100C, 100C', 100D, and 100E. The nodes 100A to 100E transmits and receives data in an autonomously distributed manner to carry out nth-order transmission. The most upstream node is assumed to be the node 100A, and the most downstream node is assumed to be the node 100E. The nodes 100A to 100E are examples of a "control device".

A node 100*i* (i=A to E) has management information 50*i*, and the management information 50*i* stores a distribution source list $src_i$ (may be referred to as "src_i", "src_i", or the like) and a distribution destination list $dst_i$ (may be referred to as "dsti", "dst_i", or the like). The distribution source list $src_i$ is a set of lists of nodes that have been passed through from the most upstream node 100A to the node 100*i*. The distribution destination list dsti is a set of lists of nodes to be passed through from the node 100*i* to the most downstream node 100E. An initial value of the distribution source list $src_i$ and the distribution destination list $dst_i$ is an empty set φ.

It is assumed that an adjacent node to which the node 100*i* transmits data is determined in advance by an organization that manages the node 100*i*.

For example, the node 100A is coupled to the node 100B, and transmits data to the node 100B. The node 100A has management information 50A. The management information 50A stores a distribution source list $src_A$ (may be referred to as "srcA", "src_A", or the like) and a distribution destination list $dst_A$ (may be referred to as "dstA", "dst_A", or the like).

The node 100B is coupled to the nodes 100A, 100C, and 100C', and transmits the data to the node 100C or to the node 100C'. The node 100B has management information 50B. The management information 50B stores a distribution source list $src_B$ (may be referred to as "srcB", "src_B", or the like) and a distribution destination list $dst_B$ (may be referred to as "dstB", "dst_B", or the like)

The node 100C is coupled to the nodes 100B and 100D, and transmits the data to the node 100D. The node 100C has management information 50C. The management information 50C stores a distribution source list $src_C$ (may be referred to as "srcC", "src_C", or the like) and a distribution destination list $dst_C$ (may be referred to as "dstC", "dst_C", or the like).

The node 100C' is coupled to the nodes 100B and 100D, and transmits the data to the node 100D. The node 100C' has management information 50C'. The management information 50C' stores a distribution source list srcC' (may be referred to as "srcC'", "src_C'", or the like) and a distribution destination list $dst_{C'}$ (may be referred to as "dstC'", "dst_C'", or the like)

The node 100D is coupled to the nodes 100C, 100C', and 100E, and transmits the data to the node 100E. The node 100D has management information 50D. The management information 50D stores a distribution source list $src_D$ (may be referred to as "srcD", "src_D", or the like) and a distribution destination list $dst_D$ (may be referred to as "dstD", "dst_D", or the like).

The node 100E is coupled to the node 100D. The node 100E has management information 50E. The management information 50E stores a distribution source list $src_E$ (may be referred to as "srcE", "src_E", or the like) and a distribution destination list $dst_E$ (may be referred to as "dstE", "dst_E", or the like).

Here, a node updates its own management information at the time of data transmission and reception, and transmits an update request of another piece of management information to another node. The node that has received the update request of the management information updates the management information, and transmits an update request of management information to still another node when a specific condition is satisfied.

Figure 2:
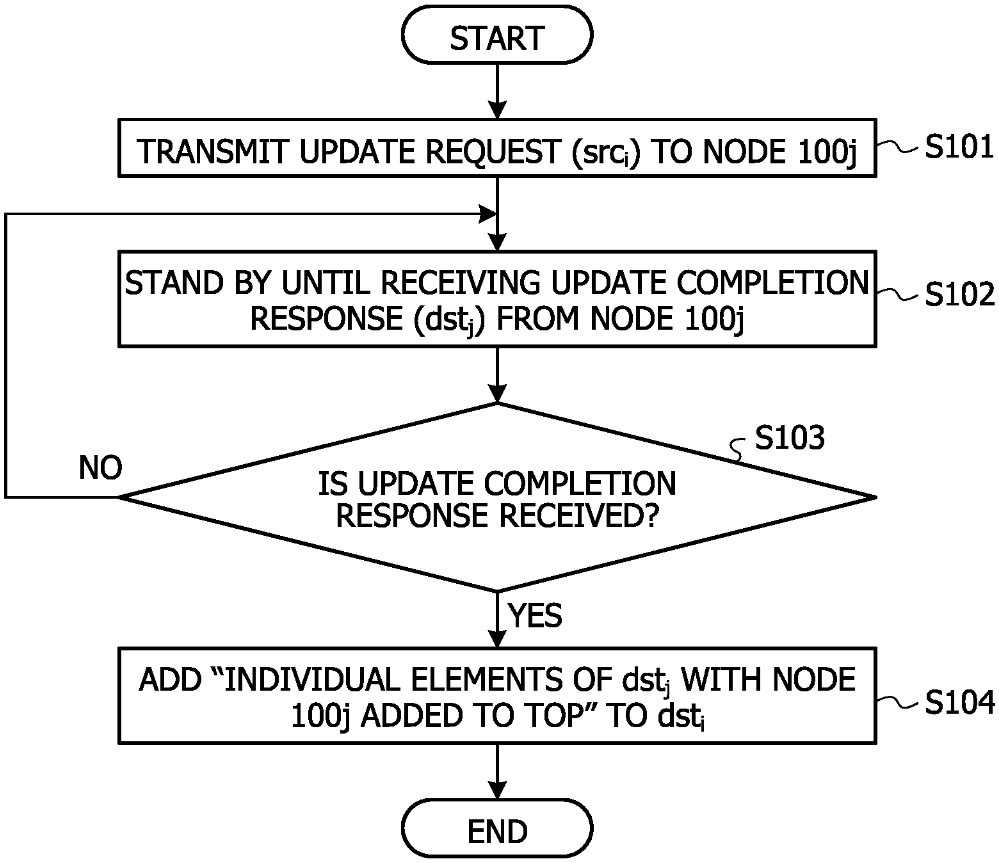
FIG. 2 is a flowchart (1) illustrating a processing procedure (Forward) at the time of transmission.
Figure 3:
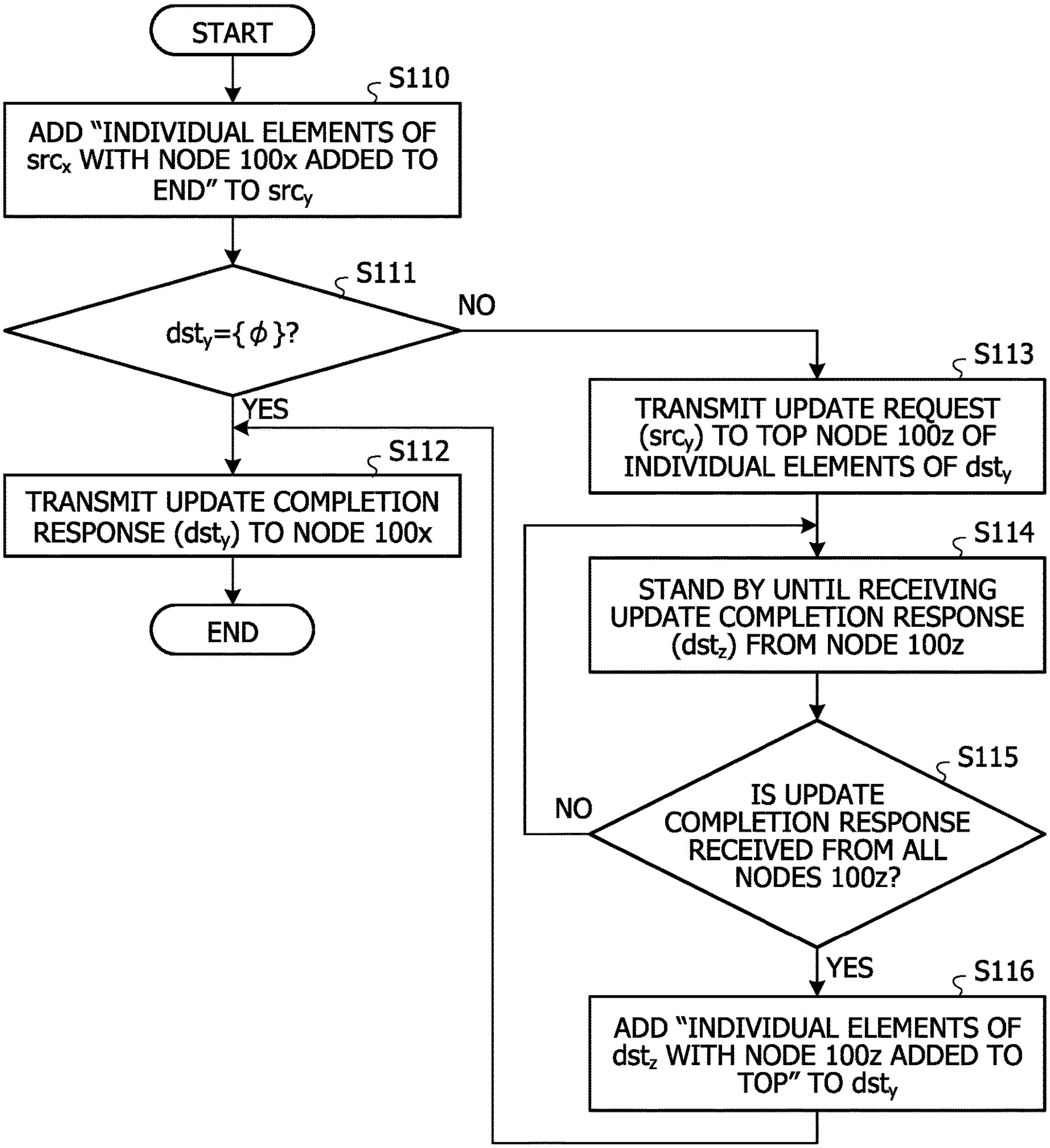
FIG. 3 is a flowchart (2) illustrating the processing procedure (Forward) at the time of transmission.

First, an exemplary processing procedure at the time of transmission of the node 100*i* will be described. In FIGS. 2 and 3 to be described below, data transmission (Forward) from the upstream side to the downstream side will be described. FIG. 2 is a flowchart (1) illustrating the processing procedure (Forward) at the time of transmission. In FIG. 2, a case where the node 100*i* transmits data to a node 100*j* will be described.

As illustrated in FIG. 2, the node 100*i* transmits an update request ($src_i$) to the node 100*j* (step S101). The node 100*i* stands by until receiving an update completion response ($dst_j$) from the node 100*j* (step S102). It is noted that the "update request ($src_i$)" means to be an update request including the distribution source list $src_i$ of the node 100*i*, and that the "update completion response ($dst_j$)" means to be a completion response including the distribution destination list $dst_j$ of the node 100*j*.

If the node 100*i* fails to receive the update completion response (No in step S103), the process proceeds to step S102. If the node 100*i* has received the update completion response (Yes in step S103), the process proceeds to step S104.

The node 100*i* adds, to the distribution destination list $dst_i$, "individual elements of $dst_j$ with the node 100*j* added to the top thereof" (step S104). Thereby, identification information of the node 100*j* and each element included in the $dst_j$ are added to the distribution destination list $dst_i$ of the node 100*i*.

FIG. 3 is a flowchart (2) illustrating the processing procedure (Forward) at the time of transmission. FIG. 3 illustrates a processing procedure of a node 100*y* in a case where an update request is transmitted from a node 100*x* to the node 100*y*. The node 100*x* is any one node of the nodes 100A to 100E. The node y is any one node of the nodes 100A to 100E that has received the update request from the node x.

The node 100*y* adds, to the distribution source list $src_y$, "individual elements of $src_x$ with the node 100*x* added to the end thereof" (step S110). Thereby, identification information of the node 100*x* and each element included in the $src_x$ are added to the distribution source list $src_y$ of the node 100*y*. The node 100*y* determines whether or not a condition of $dst_y=\{\varphi\}$ is satisfied (step S111). If the condition of $dst_y=\{\varphi\}$ is satisfied (Yes in step S111), the node 100*y* transmits an update completion response ($dst_y$) to the node 100*x* (step S112).

On the other hand, if the condition of $dst_y=\{\varphi\}$ is not satisfied (No in step S111), the node 100*y* proceeds to step S113. The node 100*y* transmits the update request ($src_y$) to a node 100*z* (which may be a plurality of nodes) at the top of individual elements of $dst_y$ (step S113).

The node 100*y* stands by until receiving an update completion response ($dst_z$) from the node 100*z* (step S114). If the node 100*y* has not received the update completion response from all the nodes 100*z* (No in step S115), the process proceeds to step S114.

If the node 100*y* has received the update completion response from all the nodes 100*z* (Yes in step S115), the process proceeds to step S116. The node 100*y* adds "individual elements of $dst_z$ with the node 100*z* added to the top thereof" to $dst_y$ (step S116), and the process proceeds to step S112.

The node 100*y* recursively executes the process when the update request is received, which has been described with reference to FIG. 3, until $dst_y$ becomes an empty set.

Figure 4:
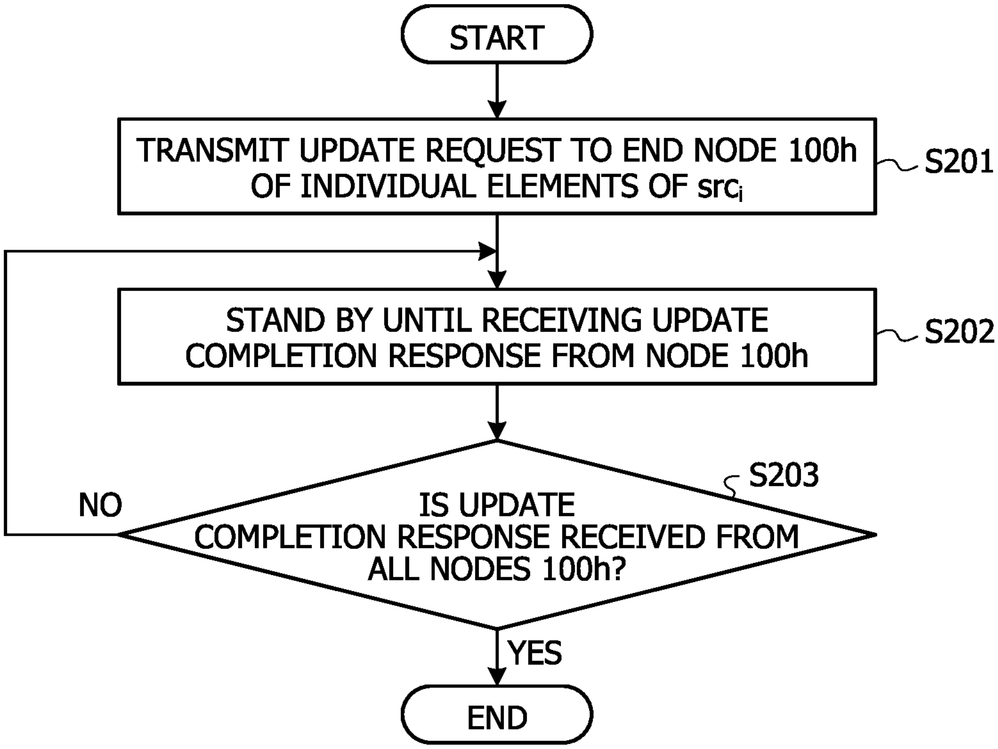
FIG. 4 is a flowchart (1) illustrating a processing procedure (Backward) at the time of transmission.
Figure 5:
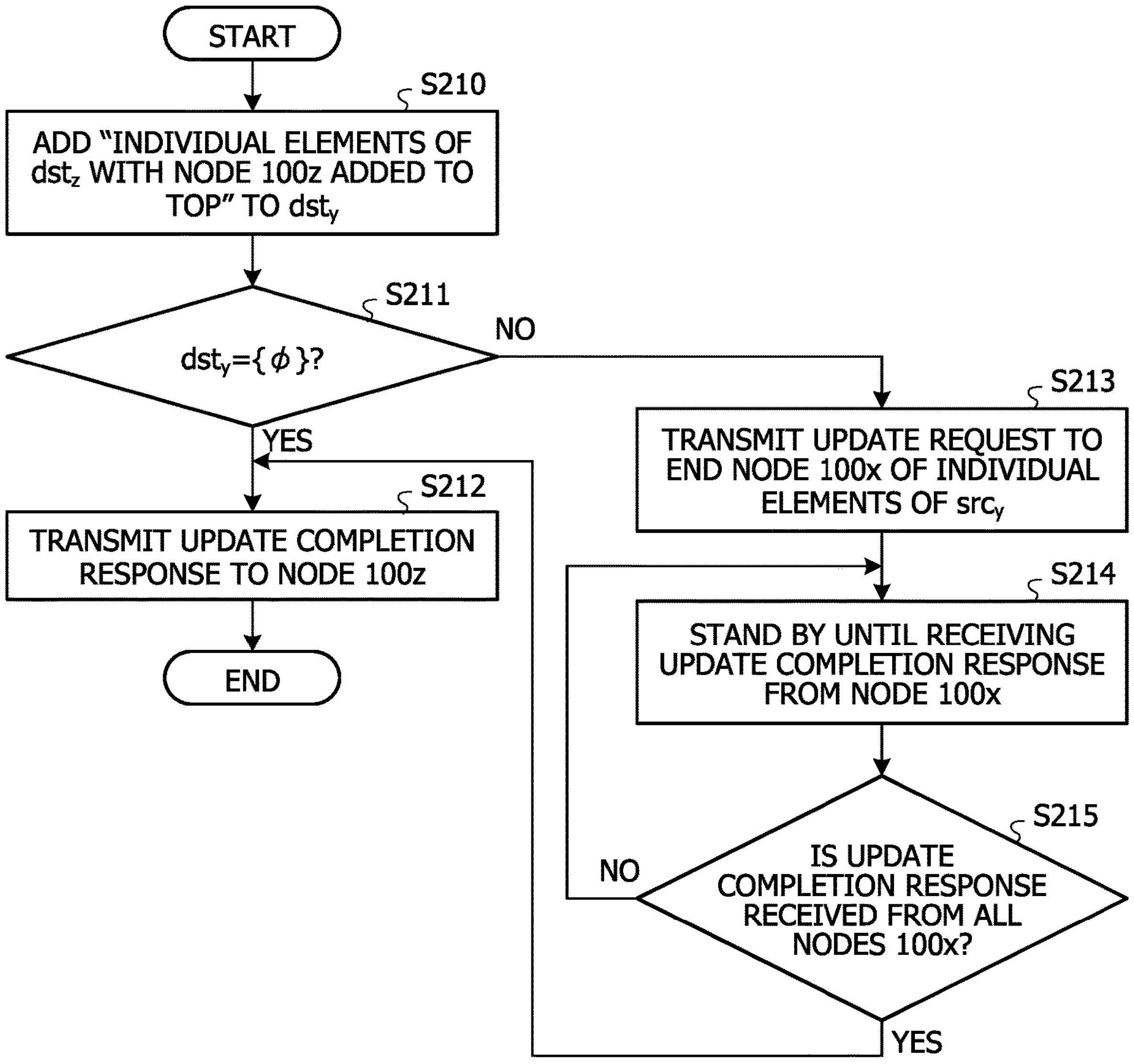
FIG. 5 is a flowchart (2) illustrating the processing procedure (Backward) at the time of transmission.

In FIGS. 4 and 5 to be described below, data transmission (Backward) from the upstream side to the downstream side will be described. FIG. 4 is a flowchart (1) illustrating the processing procedure (Backward) at the time of transmission. In FIG. 4, a case where the node 100*i* transmits data to the node 100*j* will be described.

As illustrated in FIG. 4, the node 100*i* transmits an update request to a node 100*h* (which may be a plurality of nodes) at the end of individual elements of $src_i$ (step S201). The node 100*i* stands by until receiving an update completion response from the node 100*h* (step S202).

If the node 100*i* has not received the update completion response from all the nodes 100*h* (No in step S203), the process proceeds to step S202.

If the node 100*i* has received the update completion response from all the nodes 100*h* (Yes in step S203), the process is terminated.

FIG. 5 is a flowchart (2) illustrating the processing procedure (Backward) at the time of transmission. FIG. 5 illustrates a processing procedure of the node 100*y* in a case where an update request is transmitted from the node 100*z* to the node 100*y*.

The node 100*y* adds "individual elements of $dst_z$ with the node 100*z* added to the end thereof" to $dst_y$ (step S210). The node 100*y* determines whether or not the condition of $dst_y=\{\varphi\}$ is satisfied (step S211). If the condition of $dst_y=\{\varphi\}$ is satisfied (Yes in step S211), the node 100*y* transmits an update completion response to the node 100*z* (step S212).

The node 100*y* transmits the update request to the node 100*x* (which may be a plurality of nodes) at the end of individual elements of $src_y$ (step S213). The node 100*y* stands by until receiving an update completion response from the node 100*x* (step S214).

If the node 100*y* has not received the update completion response from all the nodes 100*x* (No in step S215), the process proceeds to step S214. If the node 100*y* has received the update completion response from all the nodes 100*x* (Yes in step S215), the process proceeds to step S212.

The node 100*y* recursively executes the process when the update request is received, which has been described with reference to FIG. 5, until $dst_y$ becomes an empty set.

Next, an exemplary process will be described in which the node 100*i* executes the processes illustrated in FIGS. 2 to 5 and updates the management information 50*i*. FIGS. 6 to 23 are diagrams for explaining a process at the time of node transmission.

Figure 6:
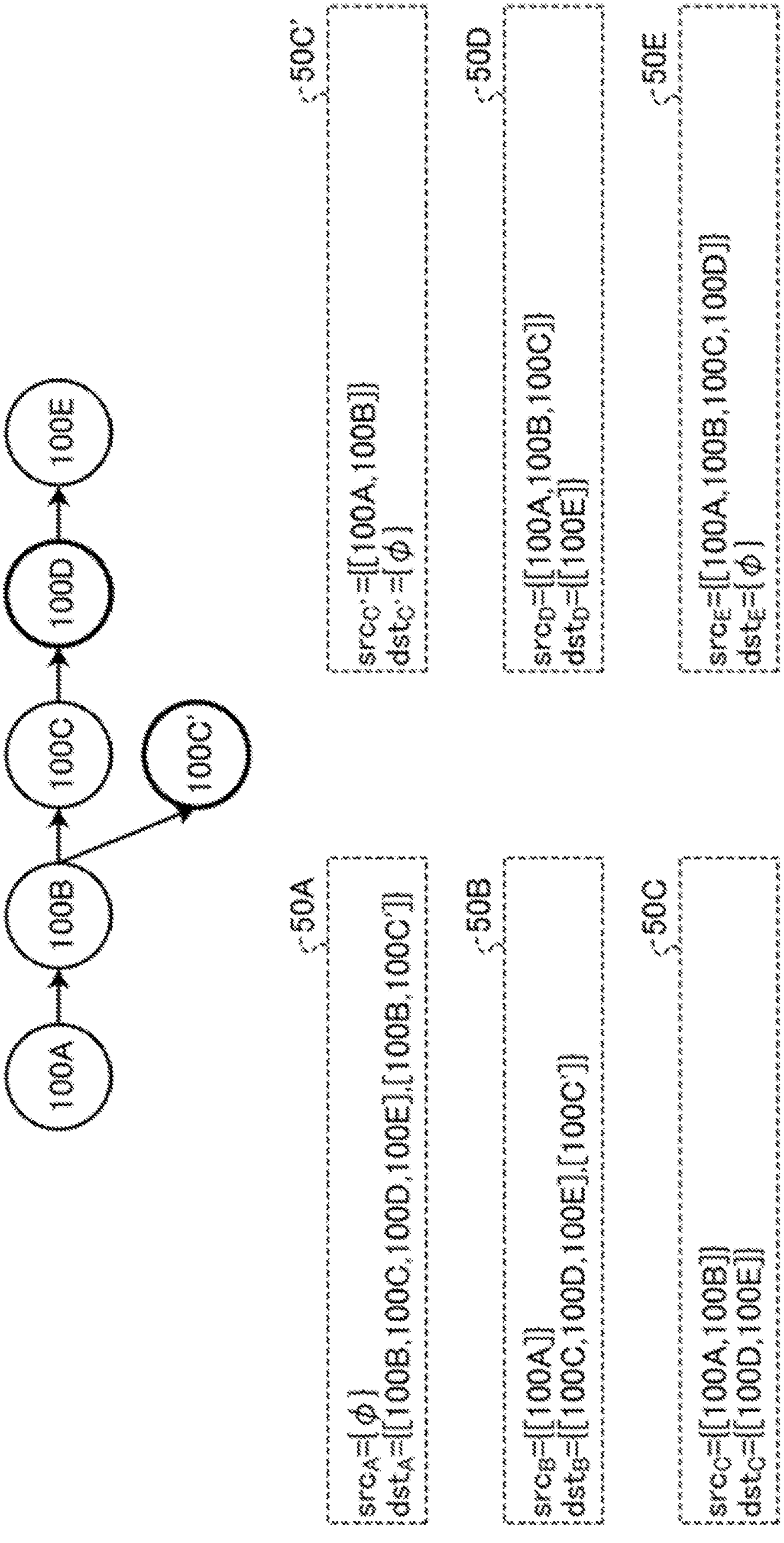
FIG. 6 is a diagram (1) for explaining a process at the time of node transmission.

FIG. 6 will be described. As a premise, the distribution source list of the management information 50A of the node 100A is assumed to be "srcA={φ}", and the distribution destination list is assumed to be "dstA={[100B, 100C, 100D, 100E], [100B, 100C']}".

The distribution source list of the management information 50B of the node 100B is assumed to be "srcB={[100A]}", and the distribution destination list is assumed to be "dstB={[100C, 100D, 100E], [100C']}".

The distribution source list of the management information 50C of the node 100C is assumed to be "srcC={[100A, 100B]}", and the distribution destination list is assumed to be "dstC={[100D, 100E]}".

The distribution source list of the management information 50C' of the node 100C' is assumed to be "srcC'={[100A, 100B]}", and the distribution destination list is assumed to be "dstC'={φ}".

The distribution source list of the management information 50D of the node 100D is assumed to be "srcD={[100A, 100B, 100C]}", and the distribution destination list is assumed to be "dstD={[100E]}".

The distribution source list of the management information 50E of the node 100E is assumed to be "srcD={[100A, 100B, 100C, 100D]}", and the distribution destination list is assumed to be "dstD={φ}".

Figure 7:
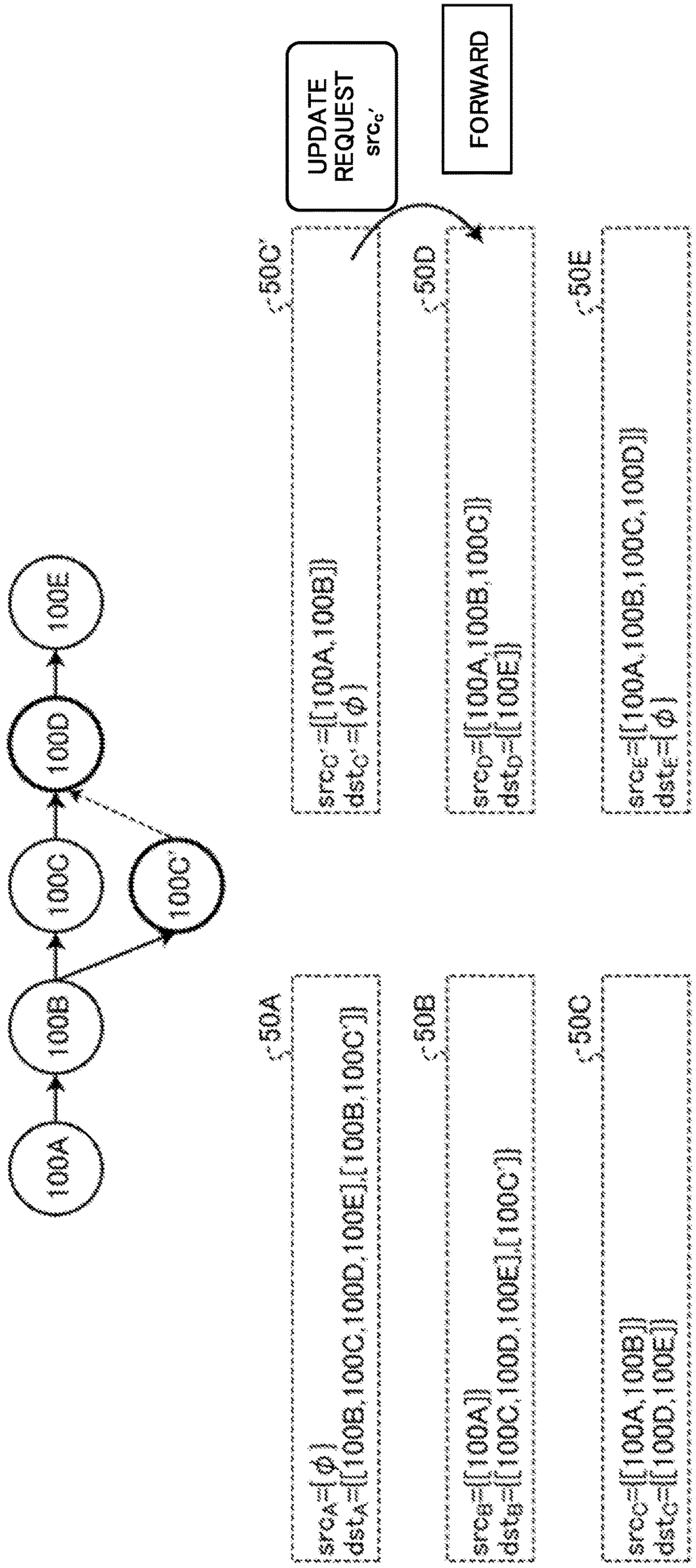
FIG. 7 is a diagram (2) for explaining the process at the time of node transmission.

The description proceeds to FIG. 7. The node 100C' transmits an update request "srcC" to the node 100D.

Figure 8:
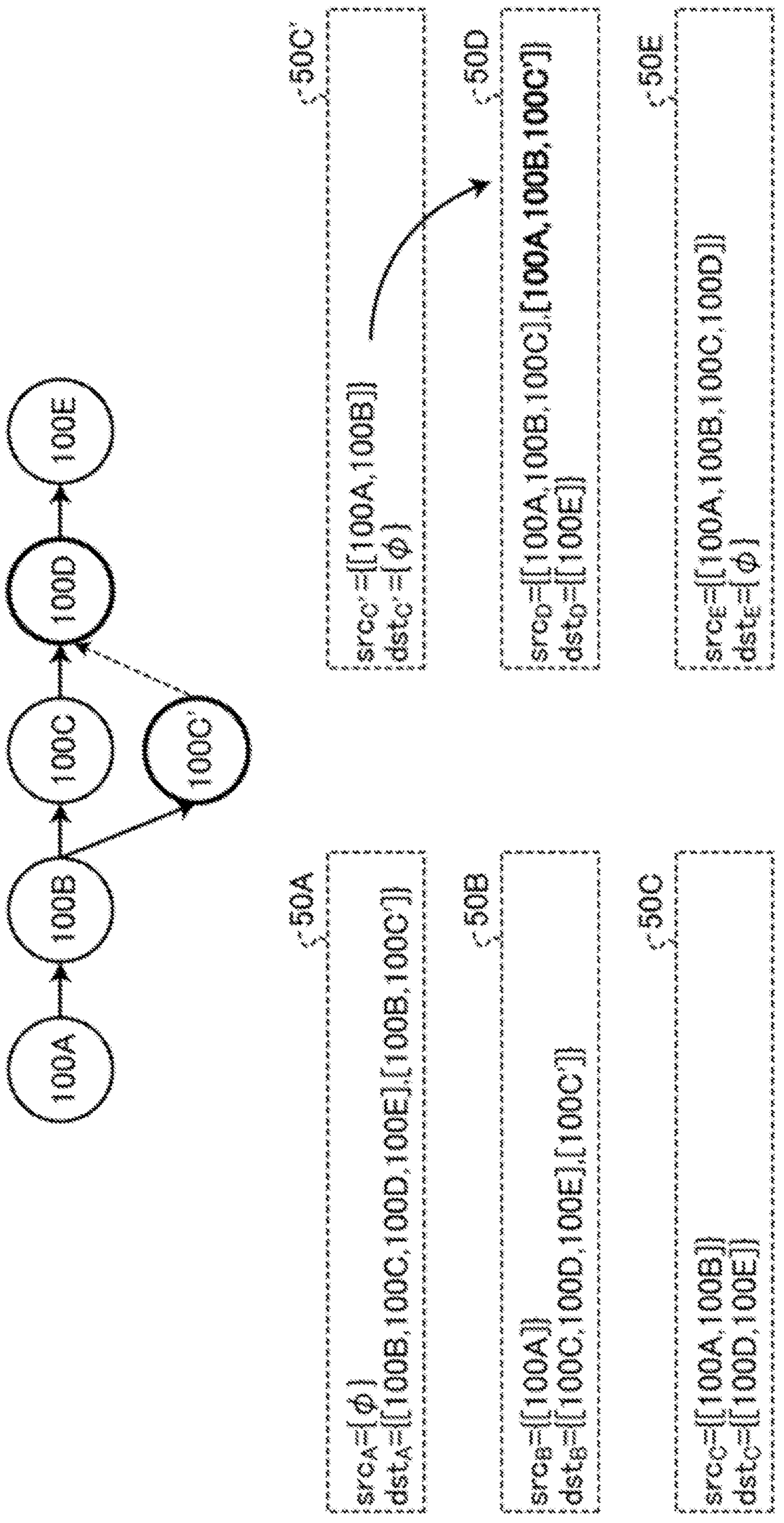
FIG. 8 is a diagram (3) for explaining the process at the time of node transmission.

The description proceeds to FIG. 8. Upon reception of the update request "srcC'", the node 100D merges "100A, 100B, 100C" obtained by adding "100C" to the end of individual elements of srcC' with srcD. As a result, the distribution source list of the node 100D becomes "srcD={[100A, 100B, 100C], [100A, 100B, 100C']}".

Figure 9:
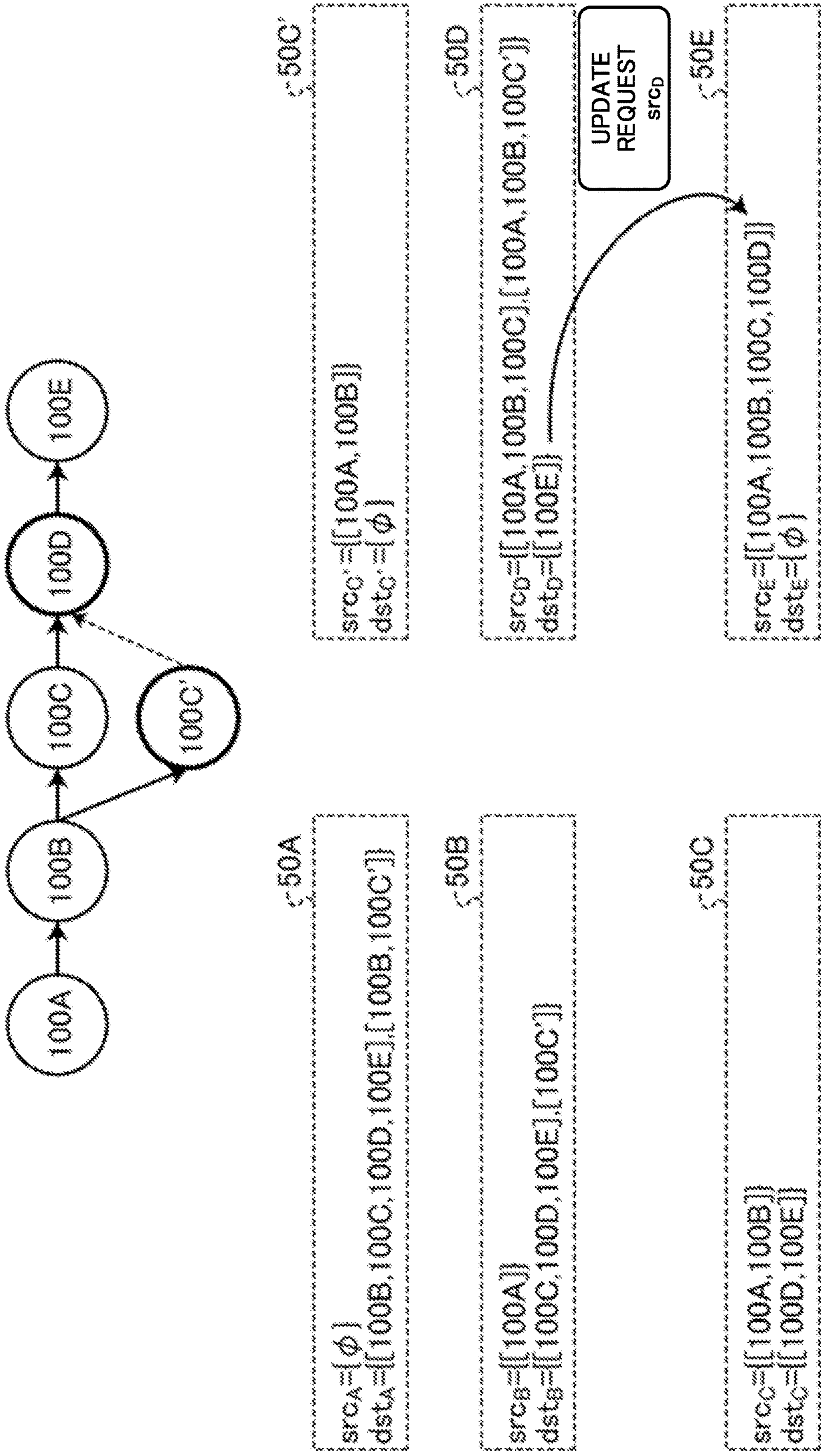
FIG. 9 is a diagram (4) for explaining the process at the time of node transmission.

The description proceeds to FIG. 9. The node 100D transmits an update request "srcD" to the node at the top of individual elements of dstD. In the example illustrated in FIG. 9, the node 100D transmits the update request "srcD" to the node 100E.

Figure 10:
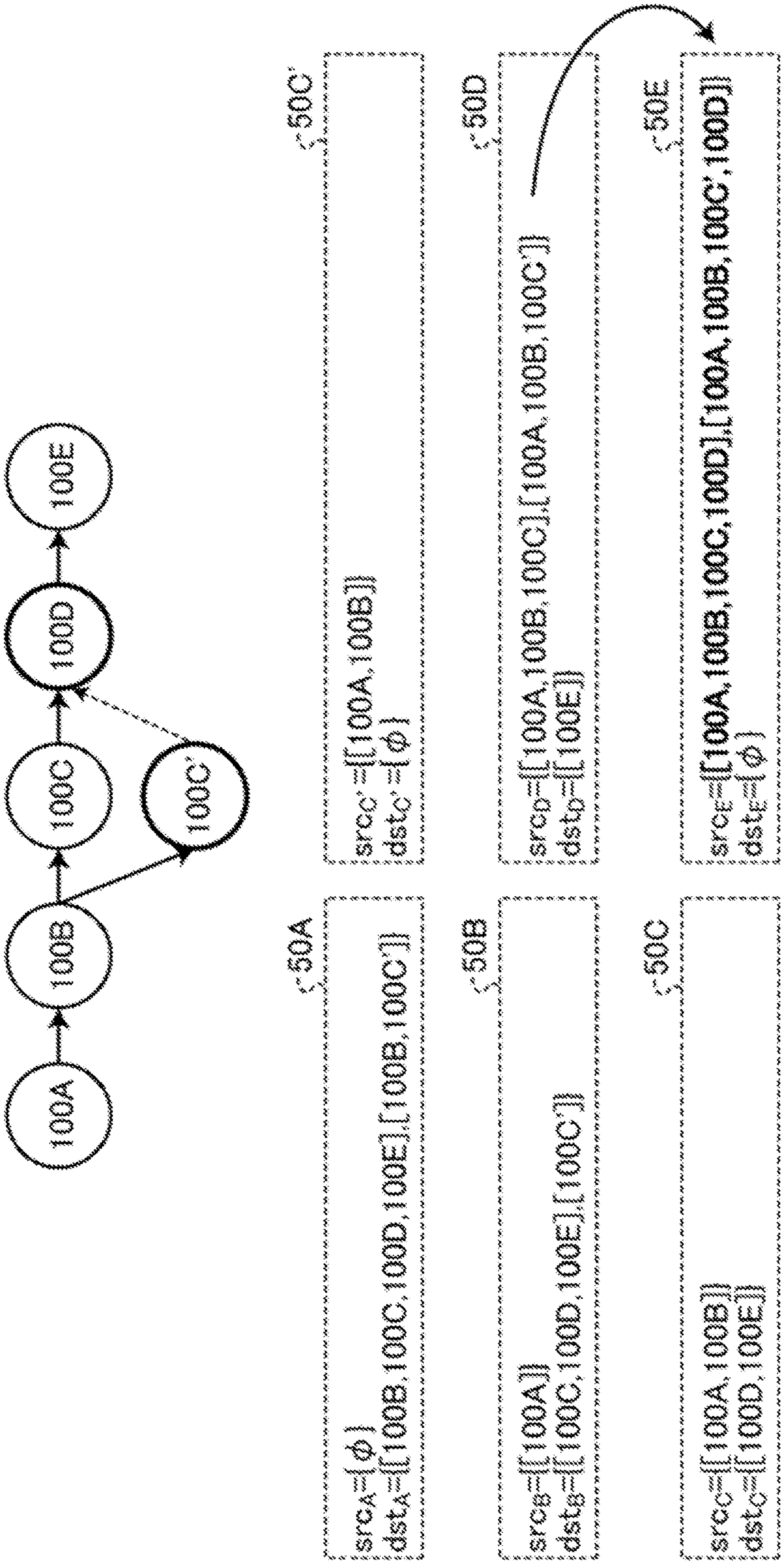
FIG. 10 is a diagram (5) for explaining the process at the time of node transmission.

The description proceeds to FIG. 10. Upon reception of the update request "srcD", the node 100E merges "100A, 100B, 100C', 100D" obtained by adding "100D" to the end of individual elements of srcD with srcE. As a result, the distribution source list of the node 100E becomes "srcE={[100A, 100B, 100C, 100D], [100A, 100B, 100C', 100D]}".

Figure 11:
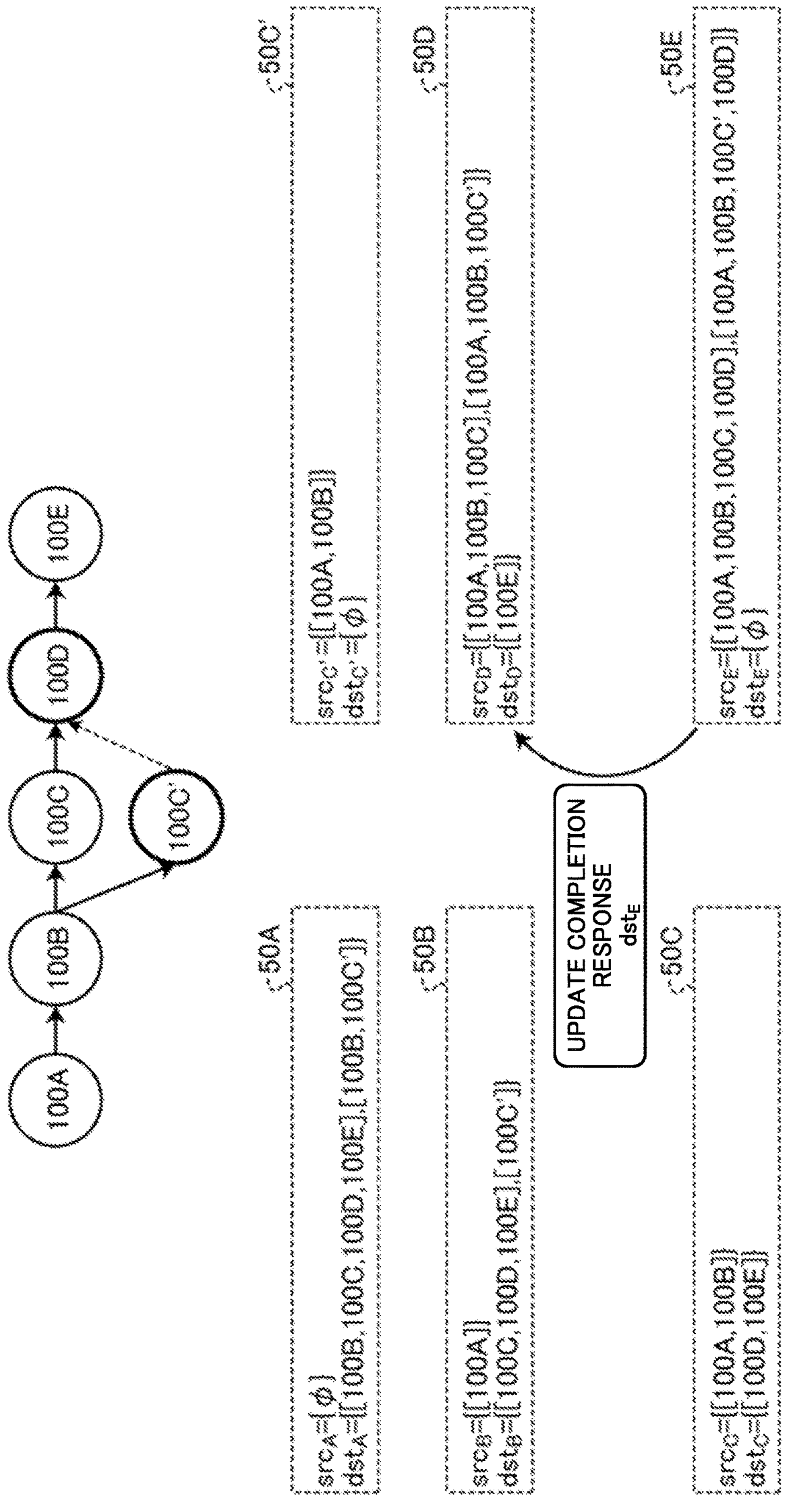
FIG. 11 is a diagram (6) for explaining the process at the time of node transmission.

The description proceeds to FIG. 11. Since the distribution destination list is "dstE={φ}", the node 100E transmits an update completion response "dstE" to the node 100D.

Figure 12:
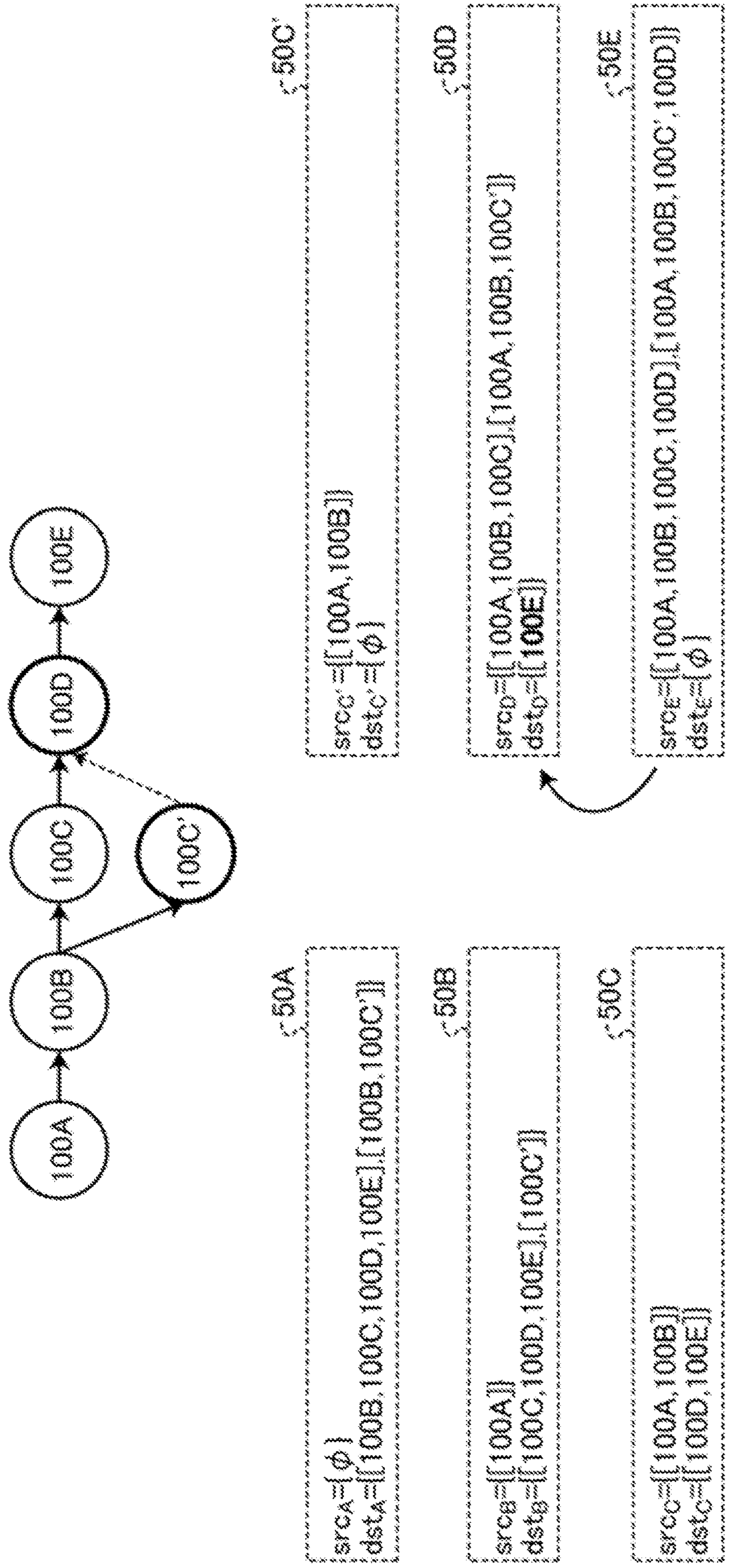
FIG. 12 is a diagram (7) for explaining the process at the time of node transmission.

The description proceeds to FIG. 12. Upon reception of the update completion response "dstE", the node 100D merges [E] obtained by adding 100E to the top of individual elements of dstE with dstD. As a result, the distribution destination list of the node 100D becomes "dstD={[100E] }". Note that the node 100D stands by until receiving the update completion response for all the transmitted update requests.

Figure 13:
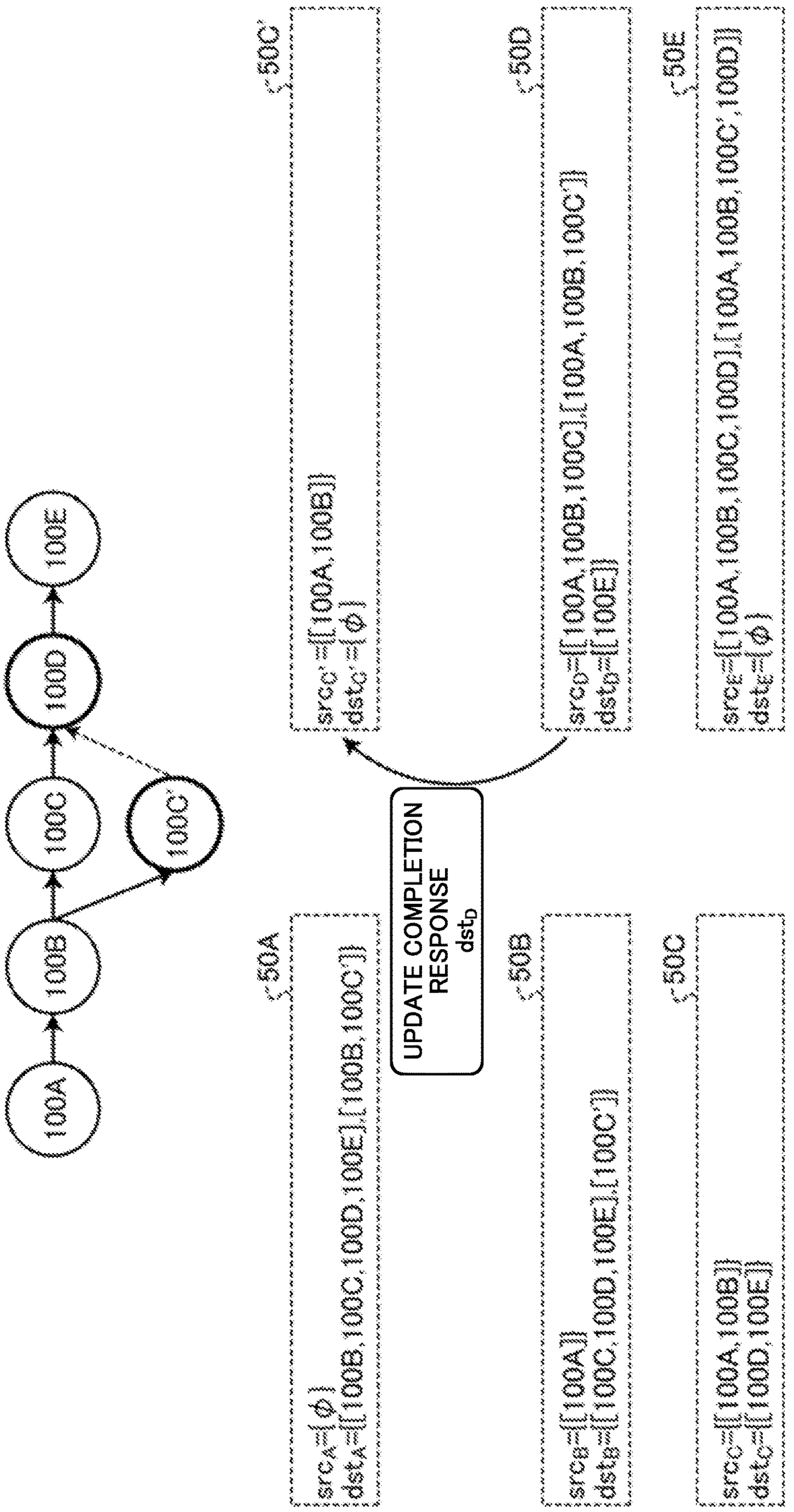
FIG. 13 is a diagram (8) for explaining the process at the time of node transmission.

The description proceeds to FIG. 13. The node 100D transmits an update completion response "dstD" to the node 100C'.

Figure 14:
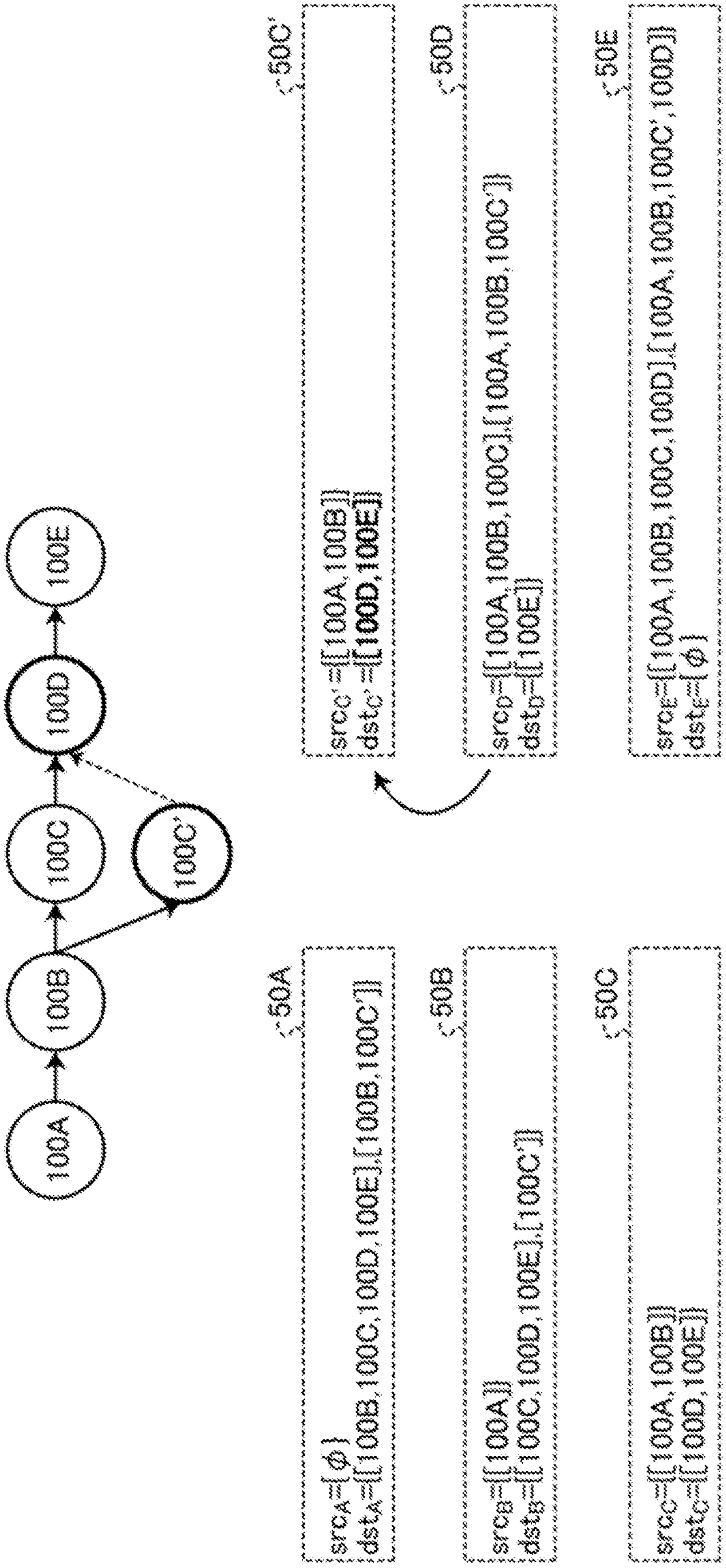
FIG. 14 is a diagram (9) for explaining the process at the time of node transmission.

The description proceeds to FIG. 14. Upon reception of the update completion response "dstD", the node 100C' merges "D, E" obtained by adding the node 100D to the top of the individual elements of dstD with dstC'. As a result, the distribution destination list of the node 100C' becomes "dstC'={[100D, 100E]}".

Figure 15:
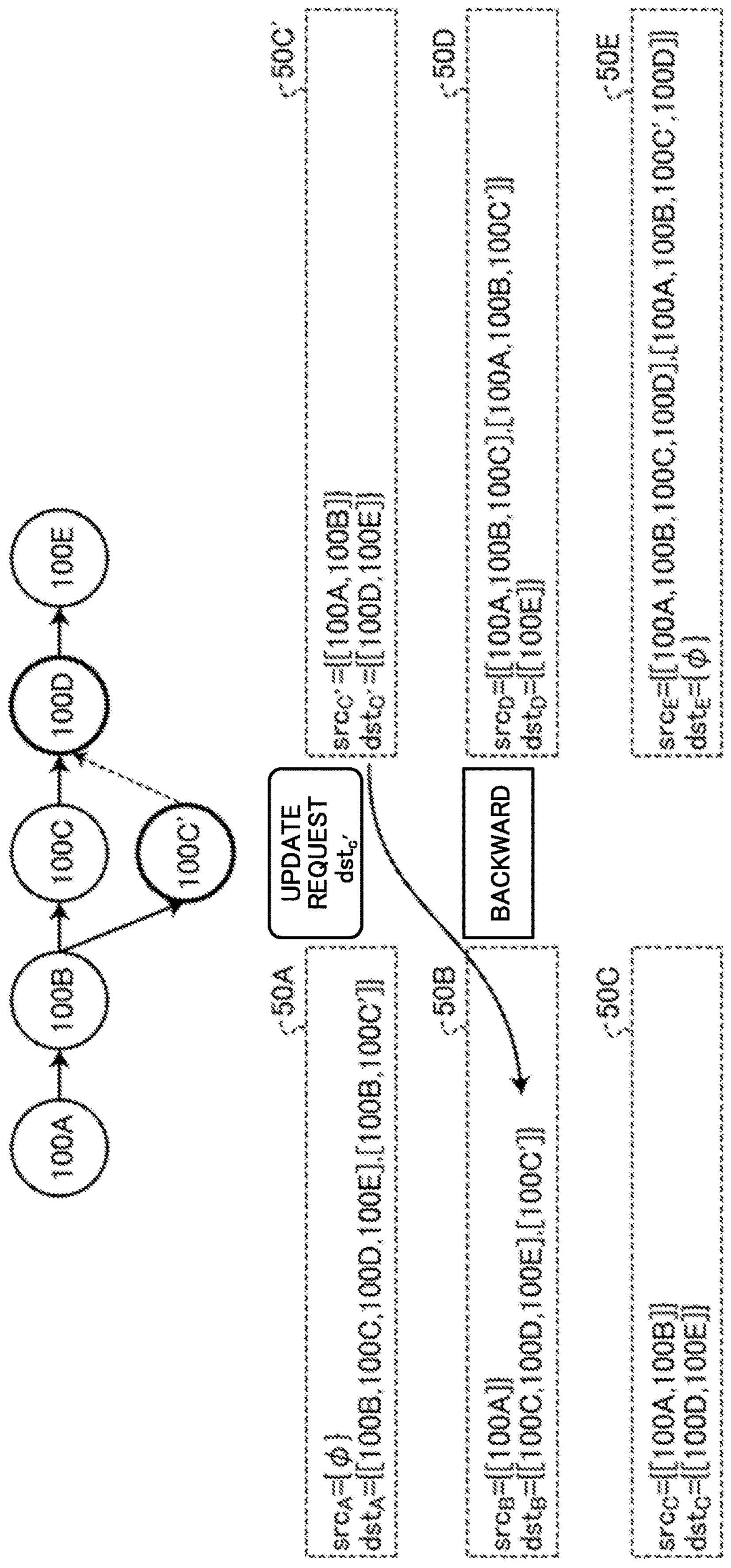
FIG. 15 is a diagram (10) for explaining the process at the time of node transmission.

The description proceeds to FIG. 15. The node 100C' transmits an update request "dstC" to the node at the end of the individual elements of the distribution source list srcC'. In the example of FIG. 15, the node 100C' transmits the update request "dstC" to the node 100B.

Figure 16:
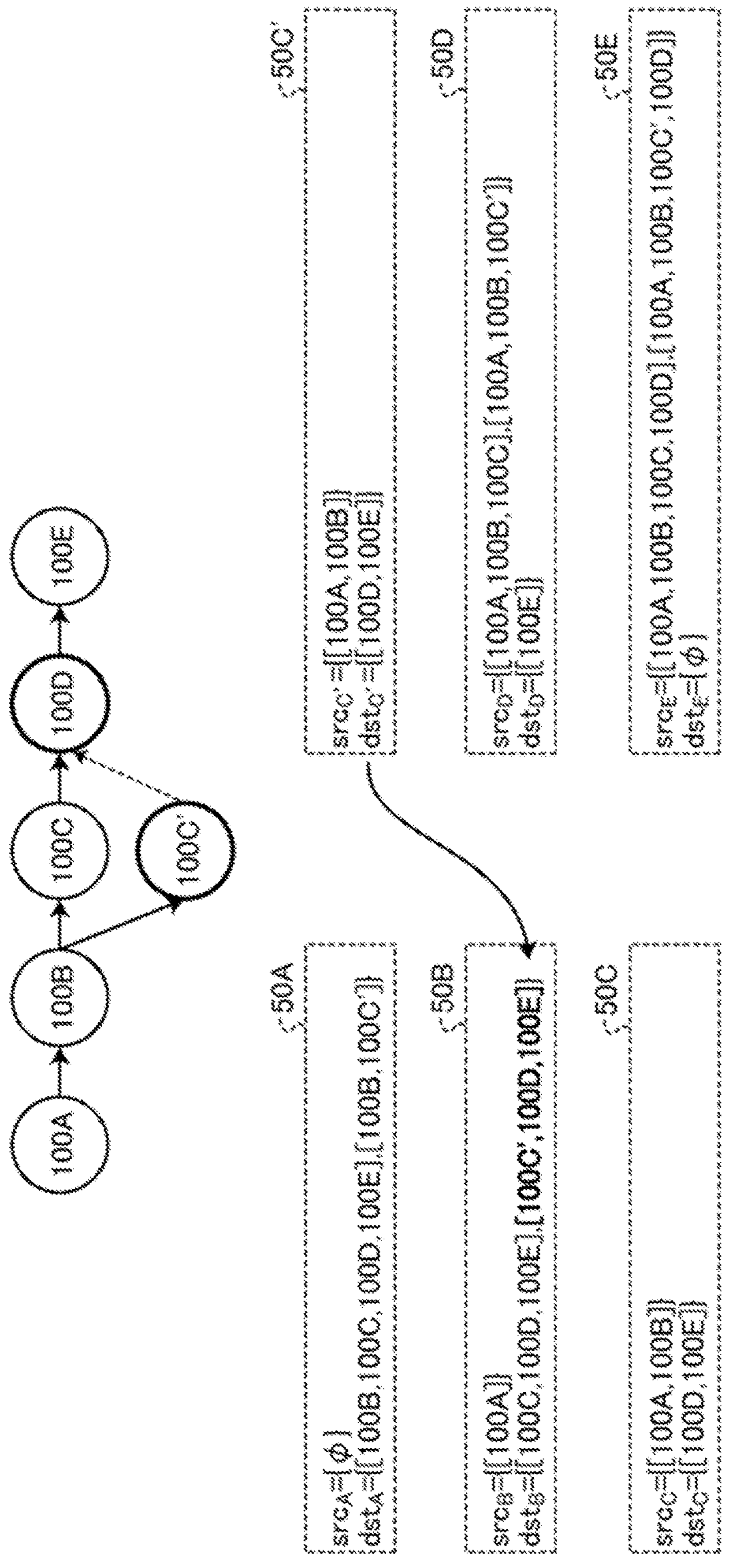
FIG. 16 is a diagram (11) for explaining the process at the time of node transmission.

The description proceeds to FIG. 16. Upon reception of the update request "dstC'", the node 100B merges "100C', 100D, 100E" obtained by adding 100C' to the top of the individual elements of dstC' with dstB. As a result, the distribution destination list of the node 100B becomes "dstB={[100C, 100D, 100E], [100C', 100D, 100E]}".

Figure 17:
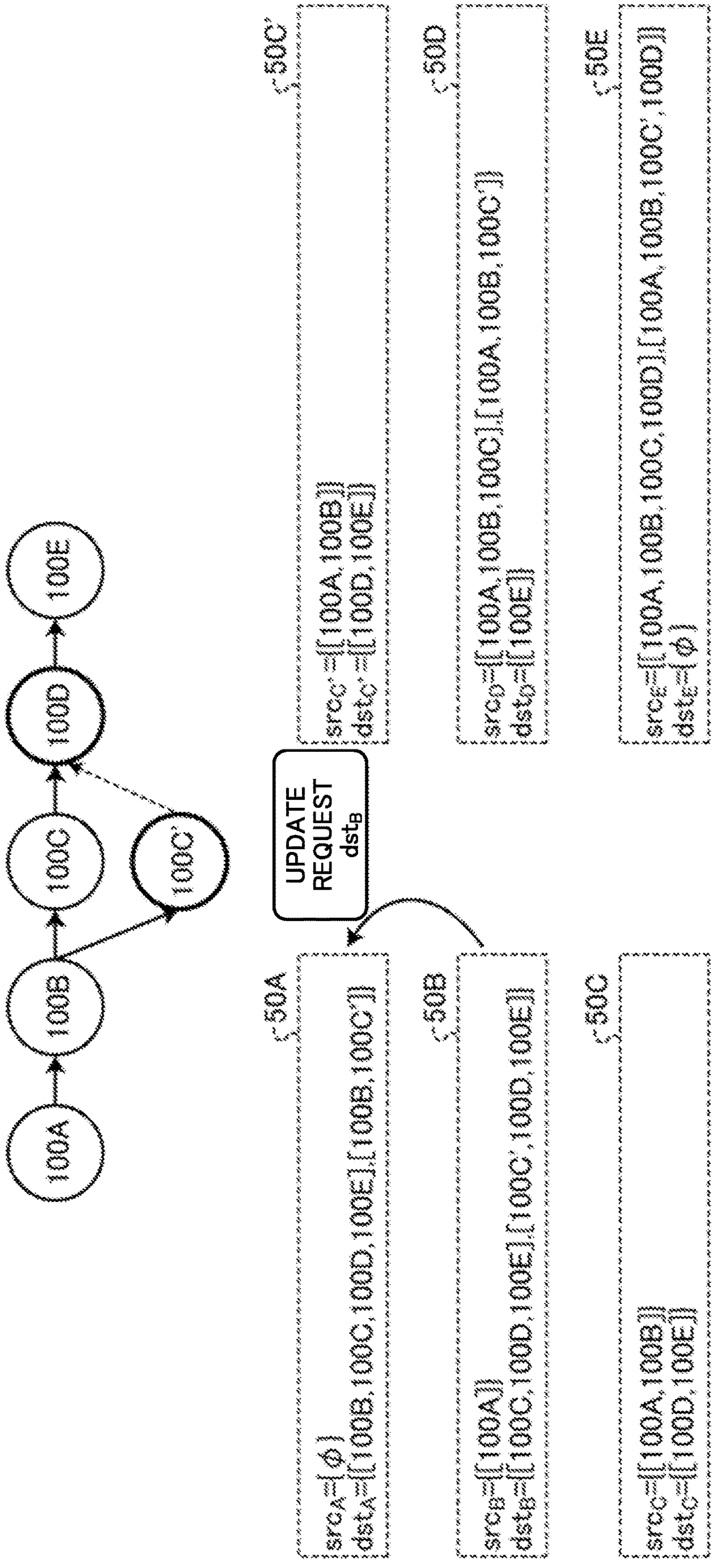
FIG. 17 is a diagram (12) for explaining the process at the time of node transmission.

The description proceeds to FIG. 17. The node 100B transmits an update request "dstB" to the node at the end of the individual elements of the distribution source list srcB. In the example of FIG. 17, the node 100B transmits the update request "dstB" to the node 100A.

Figure 18:
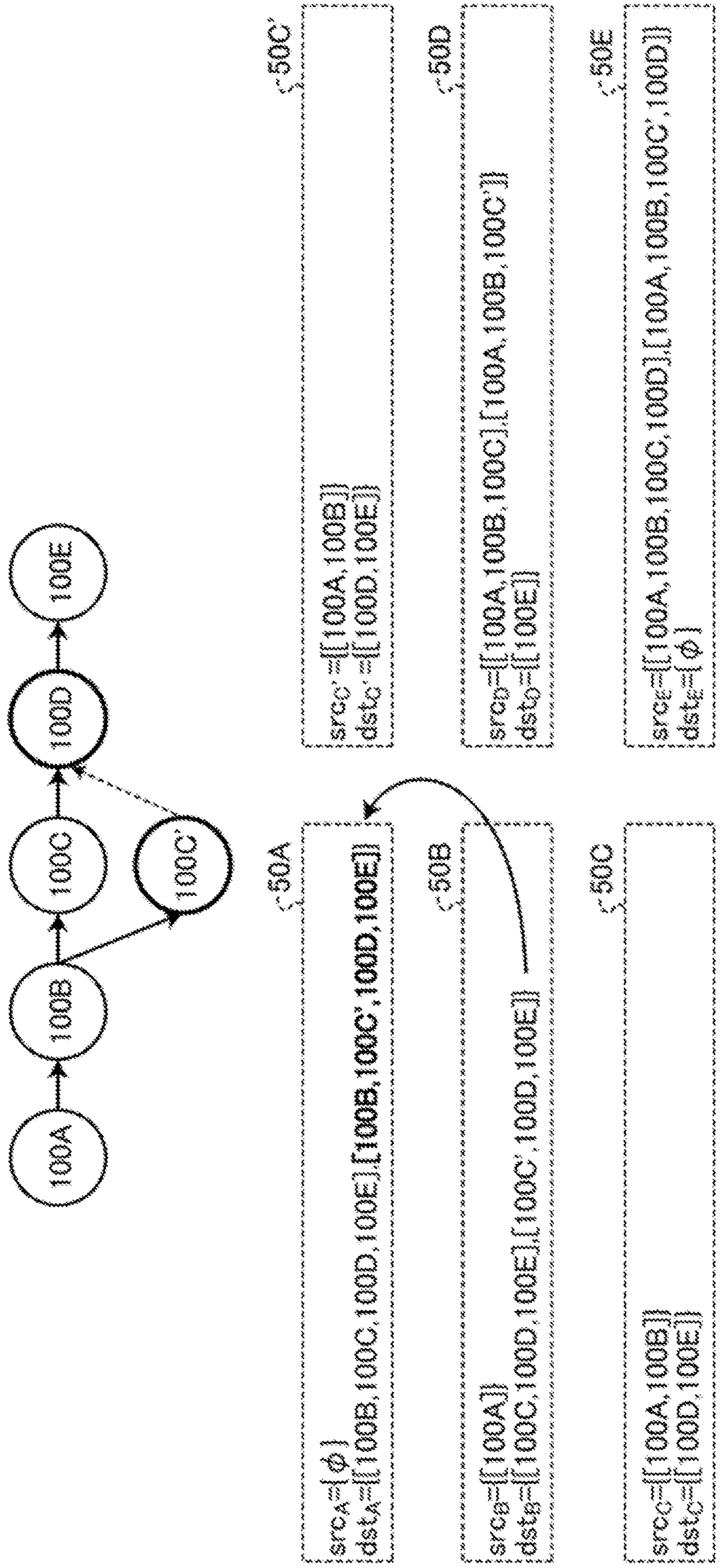
FIG. 18 is a diagram (13) for explaining the process at the time of node transmission.

The description proceeds to FIG. 18. Upon reception of the update request "dstB", the node 100A merges "100B, 100C', 100D, 100E" obtained by adding 100B to the top of the individual elements of dstB with dstA. As a result, the distribution destination list of the node 100A becomes "dstA={[100B, 100C, 100D, 100E], [100B, 100C', 100D, 100E]}".

Figure 19:
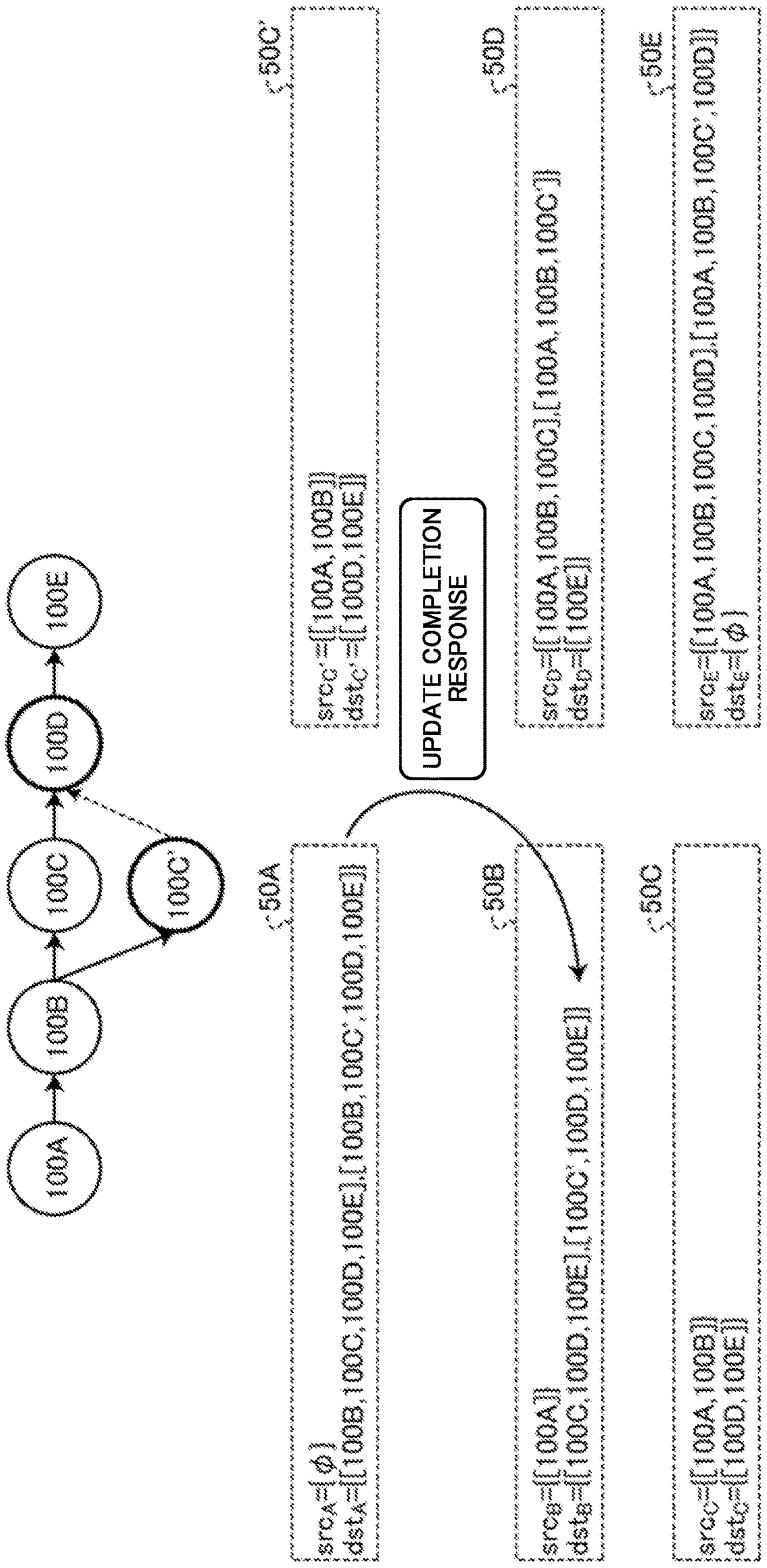
FIG. 19 is a diagram (14) for explaining the process at the time of node transmission.

The description proceeds to FIG. 19. Since the distribution source list is "srcA={φ}", the node 100A transmits an update completion response to the node 100B.

Figure 20:
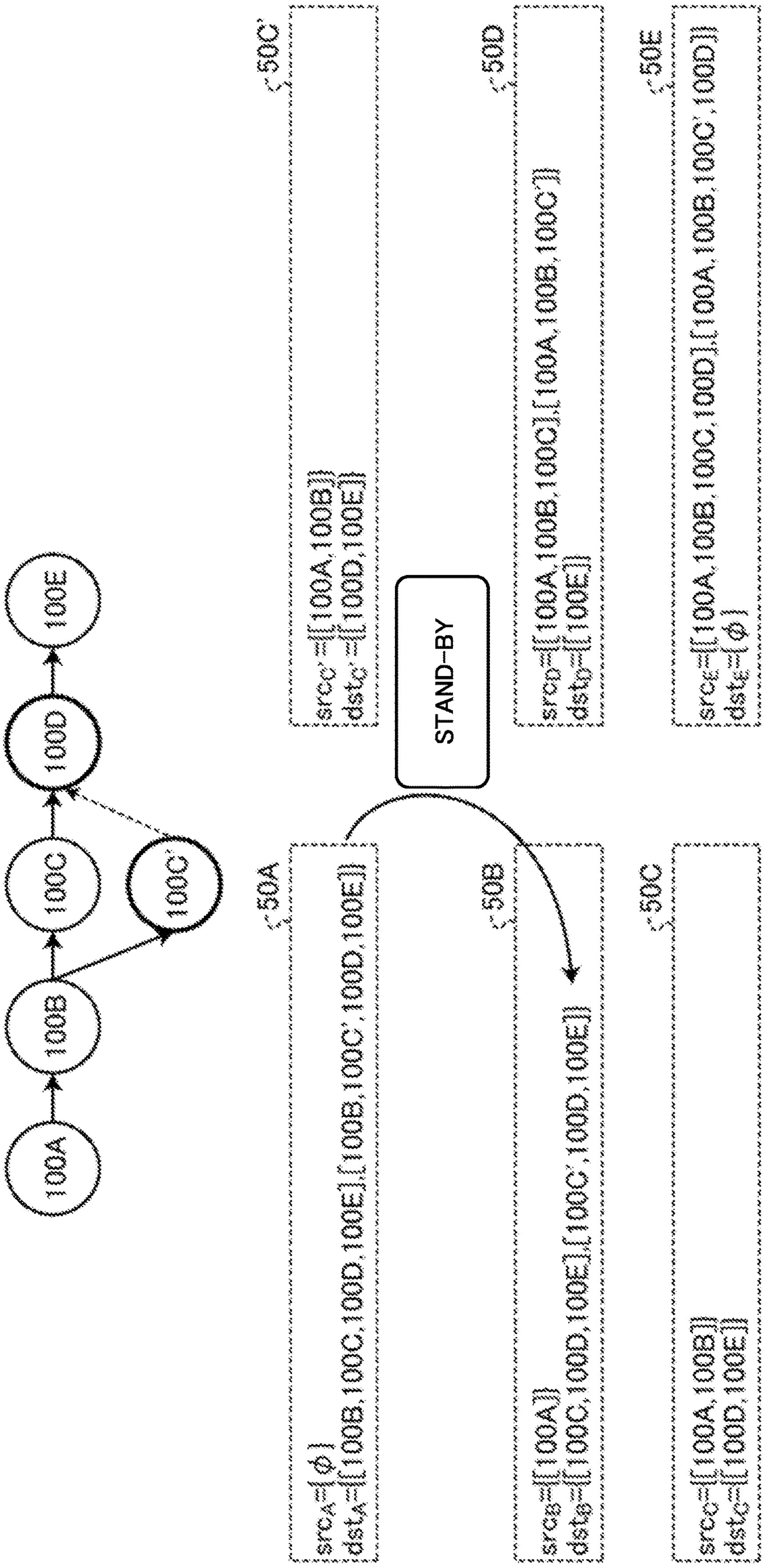
FIG. 20 is a diagram (15) for explaining the process at the time of node transmission.

The description proceeds to FIG. 20. The node 100B receives the update completion response. The node 100B stands by until receiving the update completion response for all the transmitted update requests.

Figure 21:
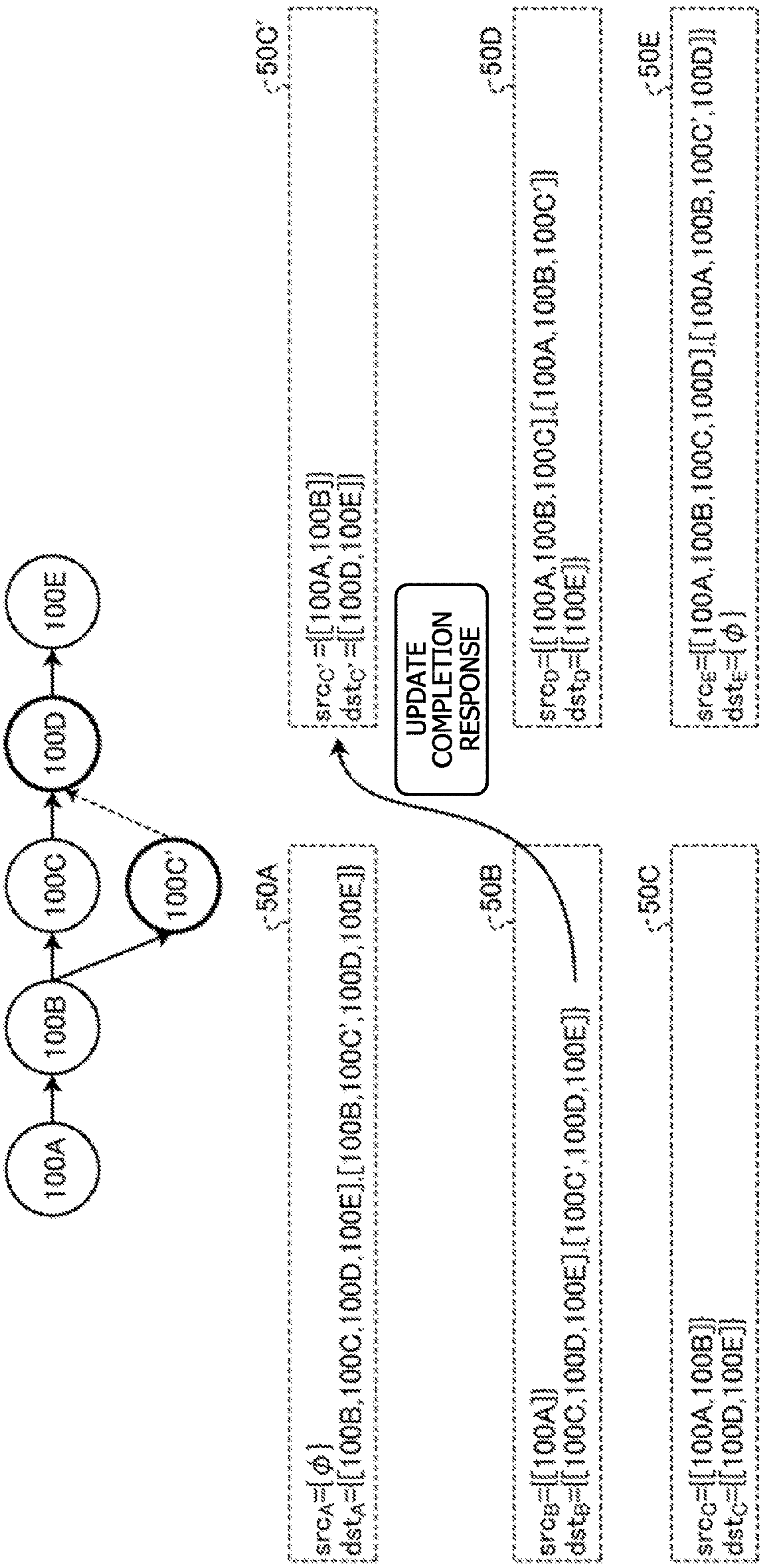
FIG. 21 is a diagram (16) for explaining the process at the time of node transmission.

The description proceeds to FIG. 21. The node 100B transmits an update completion response to the node 100C'.

Figure 22:
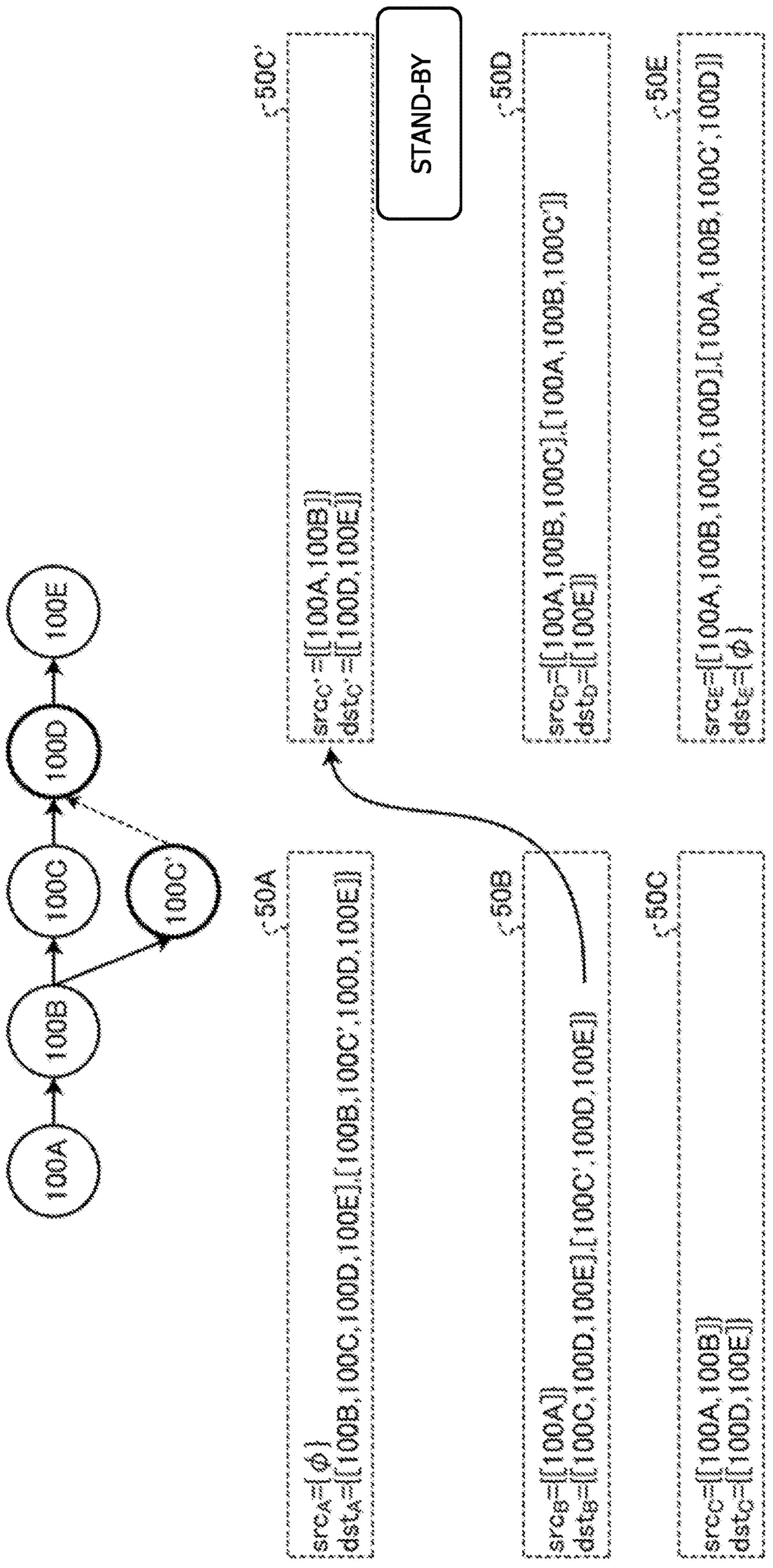
FIG. 22 is a diagram (17) for explaining the process at the time of node transmission.

The description proceeds to FIG. 22. The node 100C' receives the update completion response. The node 100C' stands by until receiving the update completion response for all the transmitted update requests.

Figure 23:
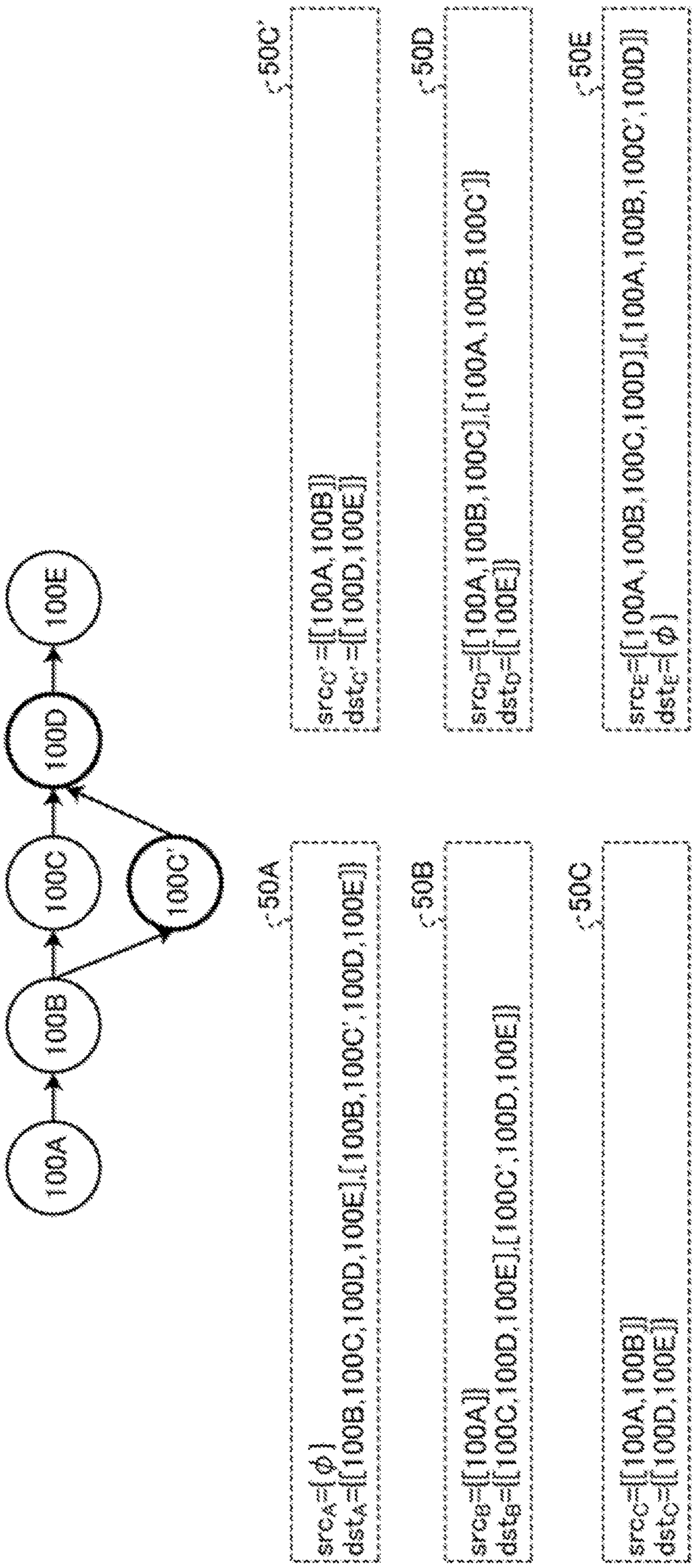
FIG. 23 is a diagram (18) for explaining the process at the time of node transmission.

The description proceeds to FIG. 23. When the series of processes by the node 100C' transmitting the update request "srcC" to the node 100D is complete, the management information 50A to 50E retain the information illustrated in FIG. 23. As a result, the node 100*i* is enabled to correctly grasp the data distribution source and the data distribution destination.

Figure 24:
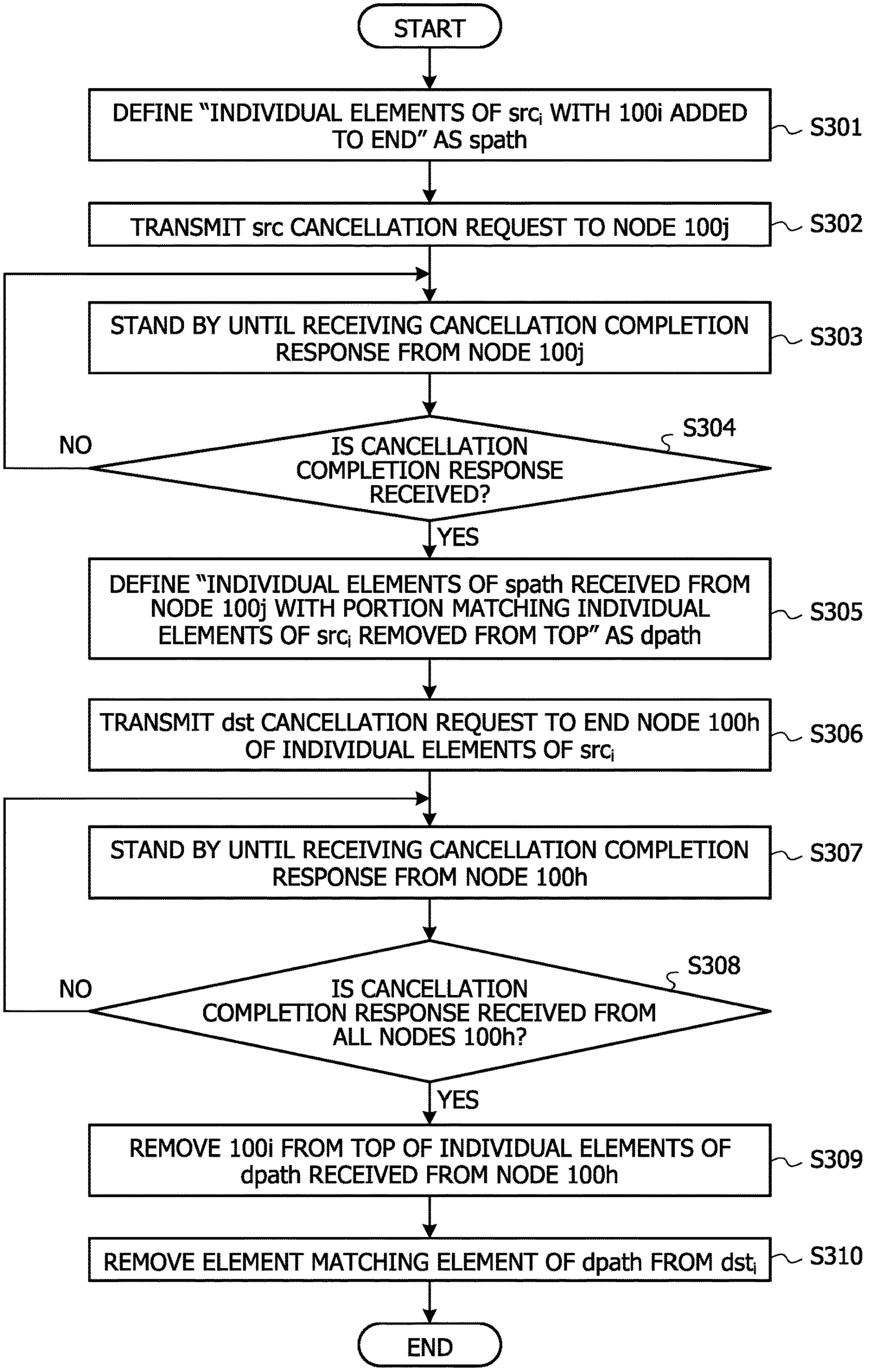
FIG. 24 is a flowchart (1) illustrating a processing procedure at the time of transmission cancellation by a node.
Figure 25:
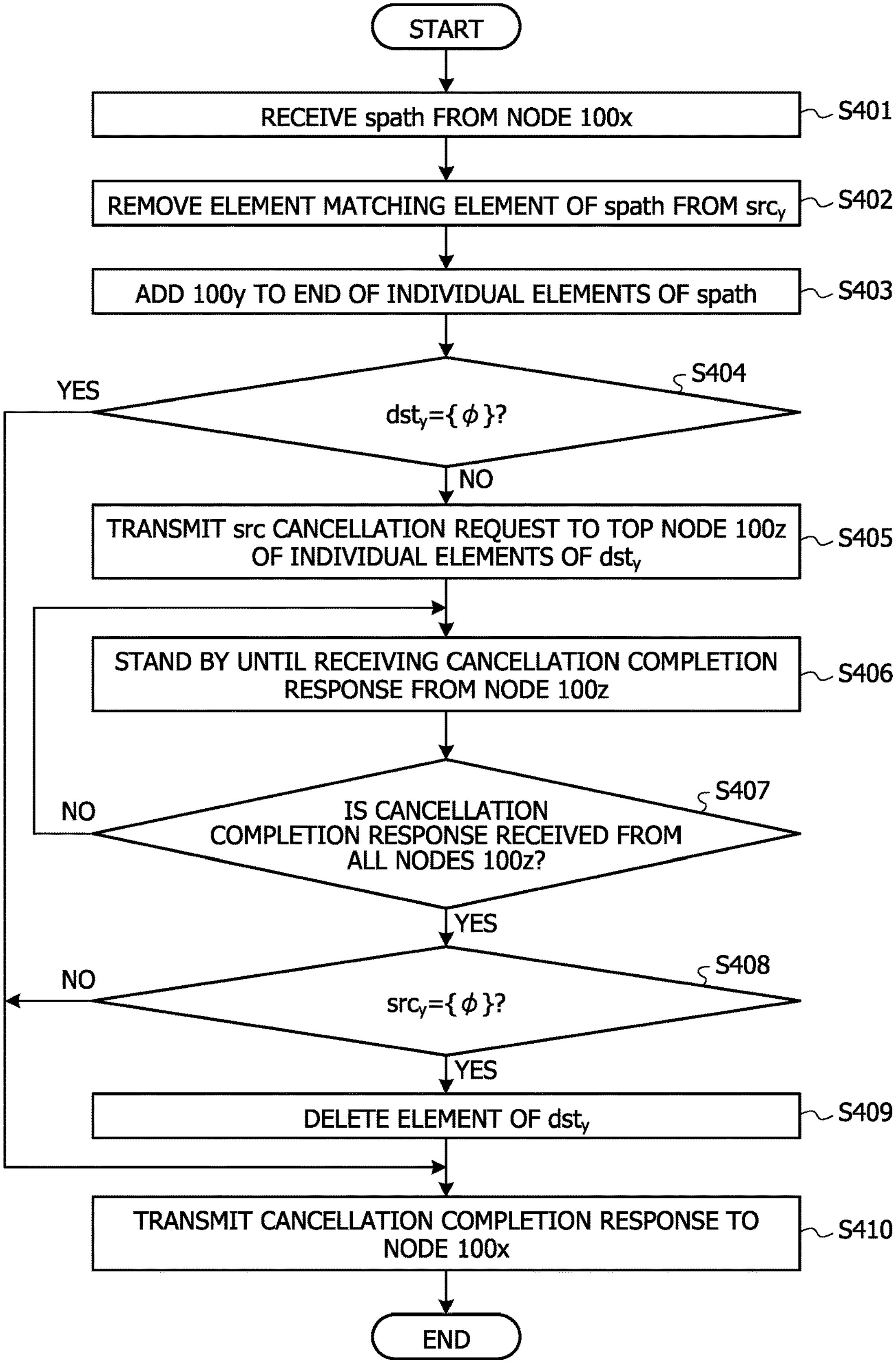
FIG. 25 is a flowchart (2) illustrating the processing procedure at the time of transmission cancellation by the node.
Figure 26:
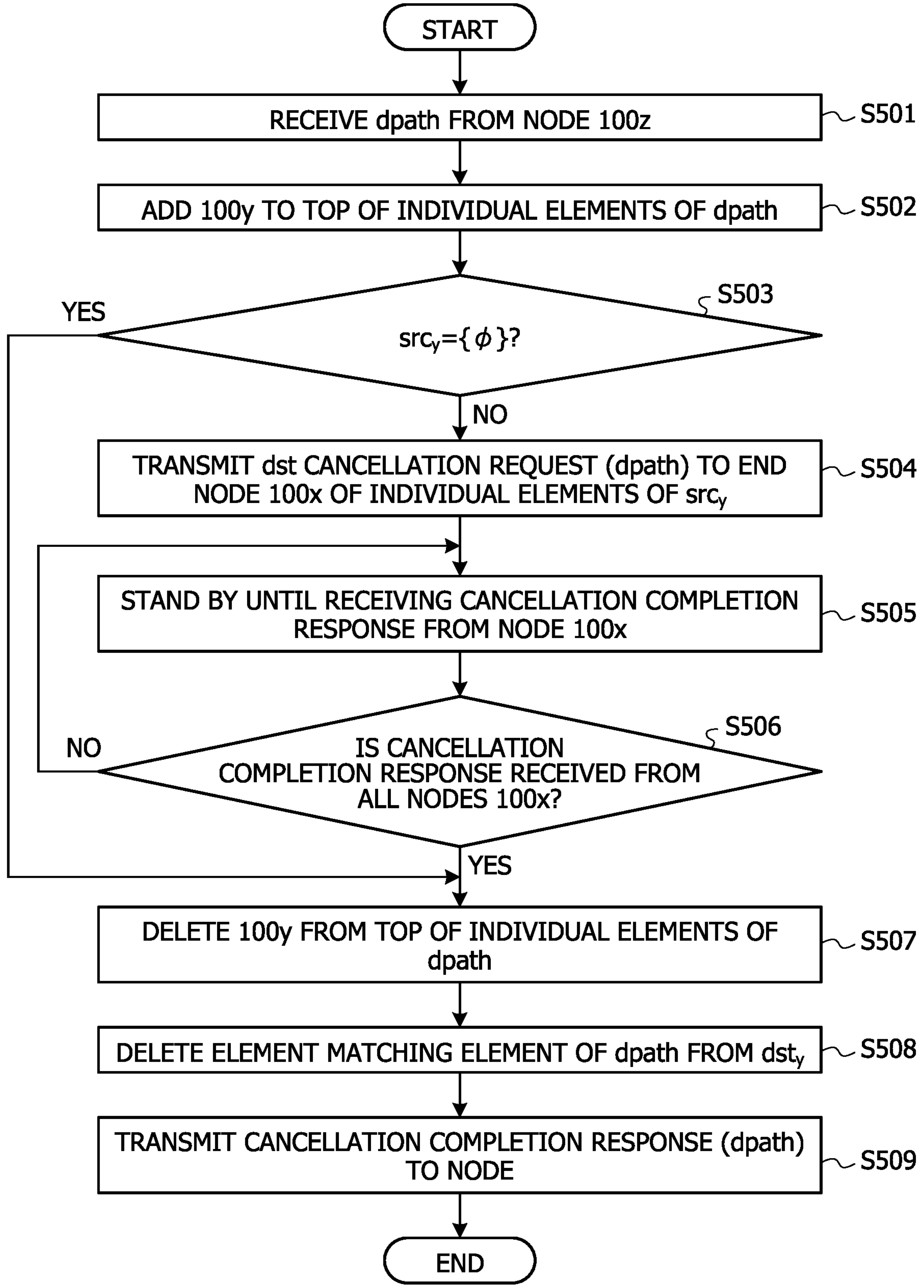
FIG. 26 is a flowchart (3) illustrating the processing procedure at the time of transmission cancellation by the node.

Next, an exemplary processing procedure at the time of transmission cancellation by the node 100*i* will be described. FIGS. 24 to 26 are flowcharts illustrating the processing procedure at the time of transmission cancellation by the node.

FIG. 24 will be described. In FIG. 24, a case where the node 100*i* transmits data (spath) related to transmission cancellation to the node 100*j* will be described. The node 100*i* defines as spath, "individual elements of srci with the 100*i* added to the end thereof" (step S301). The node 100*i* transmits a "src cancellation request" (spath) to the node 100*j* (step S302). It is noted that the "src cancellation request (spath)" means to be a cancellation request including the data "spath".

The node 100*i* stands by until receiving a cancellation completion response from the node 100*j* (step S303). If the node 100*i* fails the receive the cancellation completion response (No in step S304), the process proceeds to step S303.

On the other hand, if the node 100*i* has received the cancellation completion response (Yes in step S304), the process proceeds to step S305. The node 100*i* defines as dpath, "individual elements of spath received from the node 100*j* with a portion matching the individual elements of srci removed from the top thereof" (step S305).

The node 100*i* transmits a dst cancellation request (dpath) to the node 100*h* at the end of the individual elements of srci (step S306). It is noted that the "dst cancellation request (dpath)" means to be a cancellation request including the data "dpath". The node 100*i* stands by until receiving a cancellation completion response from the node 100*h* (step S307). If the node 100*i* has not received the cancellation completion response from all the nodes 100*h* (No in step S308), the process proceeds to step S307.

On the other hand, if the node 100*i* has received the cancellation completion response (dpath) from all the nodes 100*h* (Yes in step S308), the process proceeds to step S309. The node 100*i* removes 100*i* from the top of the individual elements of dpath received from the node 100*h* (step S309). The node 100*i* removes, from dsti, an element matching the element of dpath (step S310).

FIG. 25 will be described. FIG. 25 illustrates a processing procedure of the node 100*y* in a case where a cancellation request is transmitted from the node 100*x* to the node 100*y*.

The node 100*y* receives spath (cancellation request) from the node 100*x* (step S401). The node 100*y* removes, from srcy, an element matching the element of spath (step S402).

The node 100*y* adds 100*y* to the end of the individual elements of spath (step S403). The node 100*y* determines whether or not the condition of dsty={φ} is satisfied (step S404). If the condition of dsty={φ} is satisfied (Yes in step S404), the node 100*y* proceeds to step S410.

On the other hand, if the condition of dsty={φ} is not satisfied (No in step S404), the node 100*y* proceeds to step S405. The node 100*y* transmits a src cancellation request (spath) to the node 100*z* at the top of the individual elements of dsty (step S405).

The node 100*y* stands by until receiving a cancellation completion response from the node 100*z* (step S406). If the node 100*y* has not received the cancellation completion response from all the nodes 100*z* (No in step S407), the process proceeds to step S406.

On the other hand, if the node 100*y* has received the cancellation completion response from all the nodes 100*z* (Yes in step S407), the process proceeds to step S408. The node 100*y* determines whether or not a condition of srcy={φ} is satisfied (step S408). If the condition of srcy={φ} is not satisfied (No in step S408), the node 100*y* proceeds to step S410.

On the other hand, if the condition of srcy={φ} is satisfied (Yes in step S408), the node 100*y* deletes the element of dsty (step S409). The node 100*y* transmits a cancellation completion response (spath) to the node 100*x* (step S410).

FIG. 26 will be described. FIG. 26 illustrates a processing procedure of the node 100*y* in a case where a dst cancellation request (dpath) is transmitted from the node 100*z* to the node 100*y*.

The node 100*y* receives dpath from the node 100*z* (step S501). The node 100*y* adds 100*y* to the top of the individual elements of dpath (step S502).

The node 100*y* determines whether or not the condition of srcy={cp} is satisfied (step S503). If the condition of srcy={φ} is satisfied (Yes in step S503), the node 100*y* proceeds to step S507.

On the other hand, if the condition of srcy={cp} is not satisfied (No in step S503), the node 100*y* transmits the dst cancellation request (dpath) to the node 100*x* at the end of the individual elements of srcy (step S504).

The node 100*y* stands by until receiving a cancellation completion response from the node 100*x* (step S505). If the node 100*y* has not received the cancellation completion response from all the nodes 100*x* (No in step S506), the process proceeds to step S505.

On the other hand, if the node 100*y* has received the cancellation completion response from all the nodes 100*x* (Yes in step S506), the process proceeds to step S507. The node 100*y* deletes 100*y* from the top of the individual elements of dpath (step S507).

The node 100*y* deletes, from dsty, an element matching the element of dpath (step S508). The node 100*y* transmits a cancellation completion response (dpath) to the node 100*z* (step S509).

Next, an exemplary process in which, when transmission cancellation is transmitted, the node 100*i* executes the processes illustrated in FIGS. 24 to 26 and updates the management information 50*i* will be described. FIGS. 27 to 42 are diagrams for explaining the process at the time of transmission cancellation.

Figure 27:
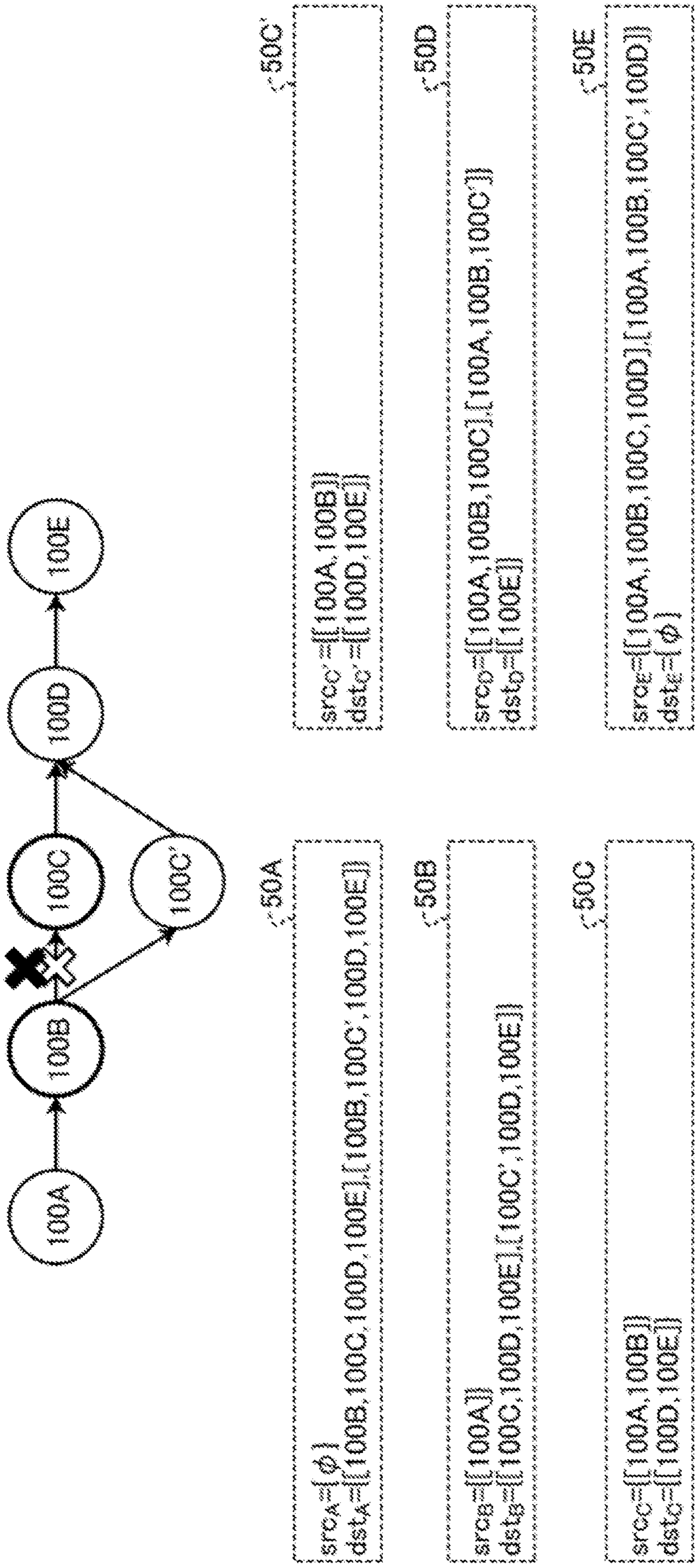
FIG. 27 is a diagram (1) for explaining a process at the time of transmission cancellation.

FIG. 27 will be described. As a premise, the distribution source list of the management information 50A of the node 100A is assumed to be "srcA={cp}", and the distribution destination list is assumed to be "dstA={[100B, 100C, 100D, 100E], [100B, 100C', 100D, 100E]}".

The distribution source list of the management information 50B of the node 100B is assumed to be "srcB={[100A] }", and the distribution destination list is assumed to be "dstB={[100C, 100D, 100E], [100C', 100D, 100E]}".

The distribution source list of the management information 50C of the node 100C is assumed to be "srcC={[100A, 100B]}", and the distribution destination list is assumed to be "dstC={[100D, 100E]}".

The distribution source list of the management information 50C' of the node 100C' is assumed to be "srcC'={[100A, 100B]}", and the distribution destination list is assumed to be "dstC'={[100D, 100E]}".

The distribution source list of the management information 50D of the node 100D is assumed to be "srcD={[100A, 100B, 100C], [100A, 100B, 100C']}", and the distribution destination list is assumed to be "dstD={[100E]}".

The distribution source list of the management information 50E of the node 100E is assumed to be "srcD={[100A, 100B, 100C, 100D], [100A, 100B, 100C', 100D]}", and the distribution destination list is assumed to be "dstD={φ}".

Figure 28:
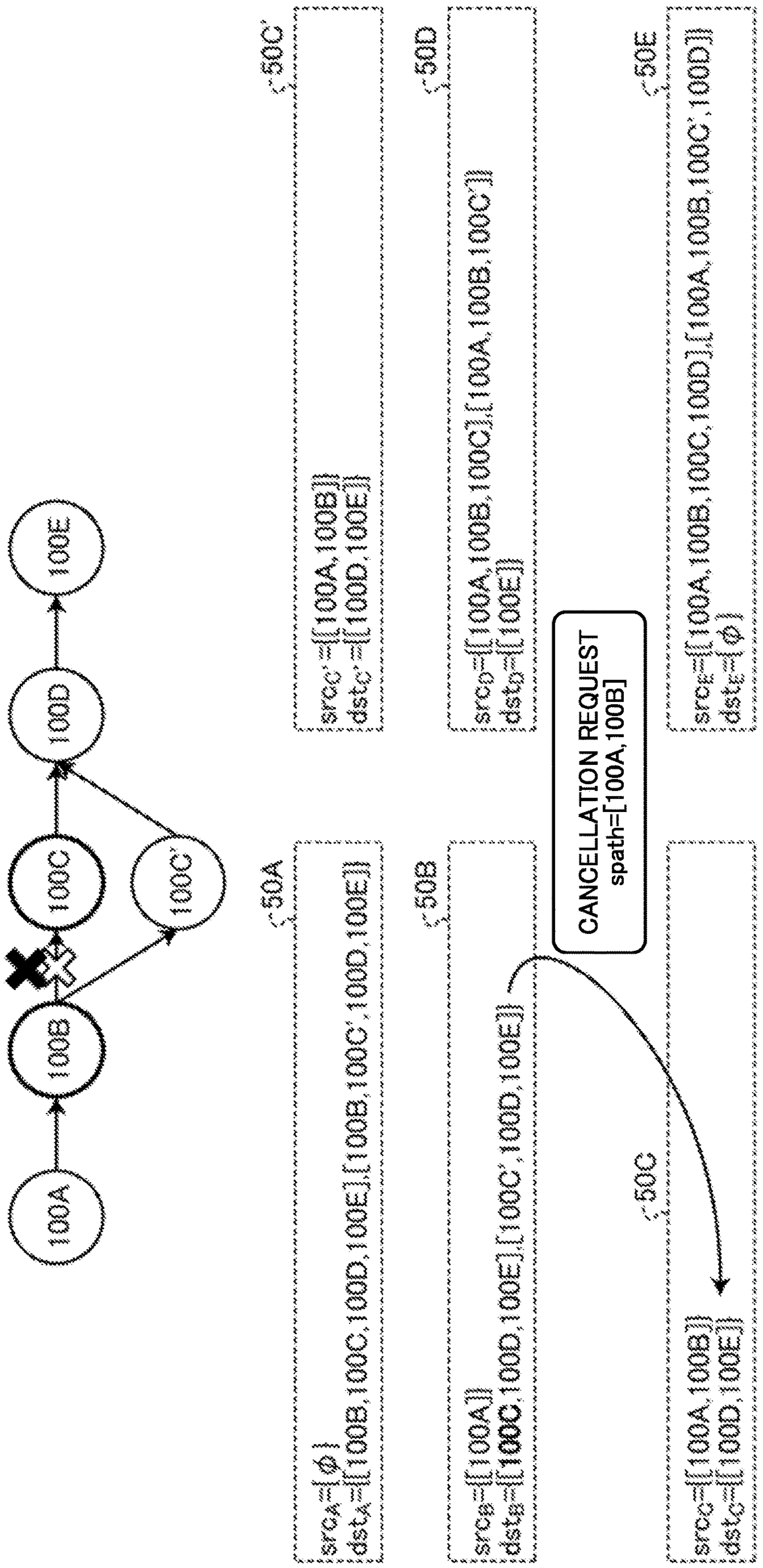
FIG. 28 is a diagram (2) for explaining the process at the time of transmission cancellation.

The description proceeds to FIG. 28. The node 100B performs the following process in a case of canceling data transmission from the node 100B to the node 100C. The node 100B defines spath=[100A, 100B] obtained by adding 100B to the end of the individual elements of srcB. The node 100B transmits a cancellation request "spath=[100A, 100B]" to the node 100C.

Figure 29:
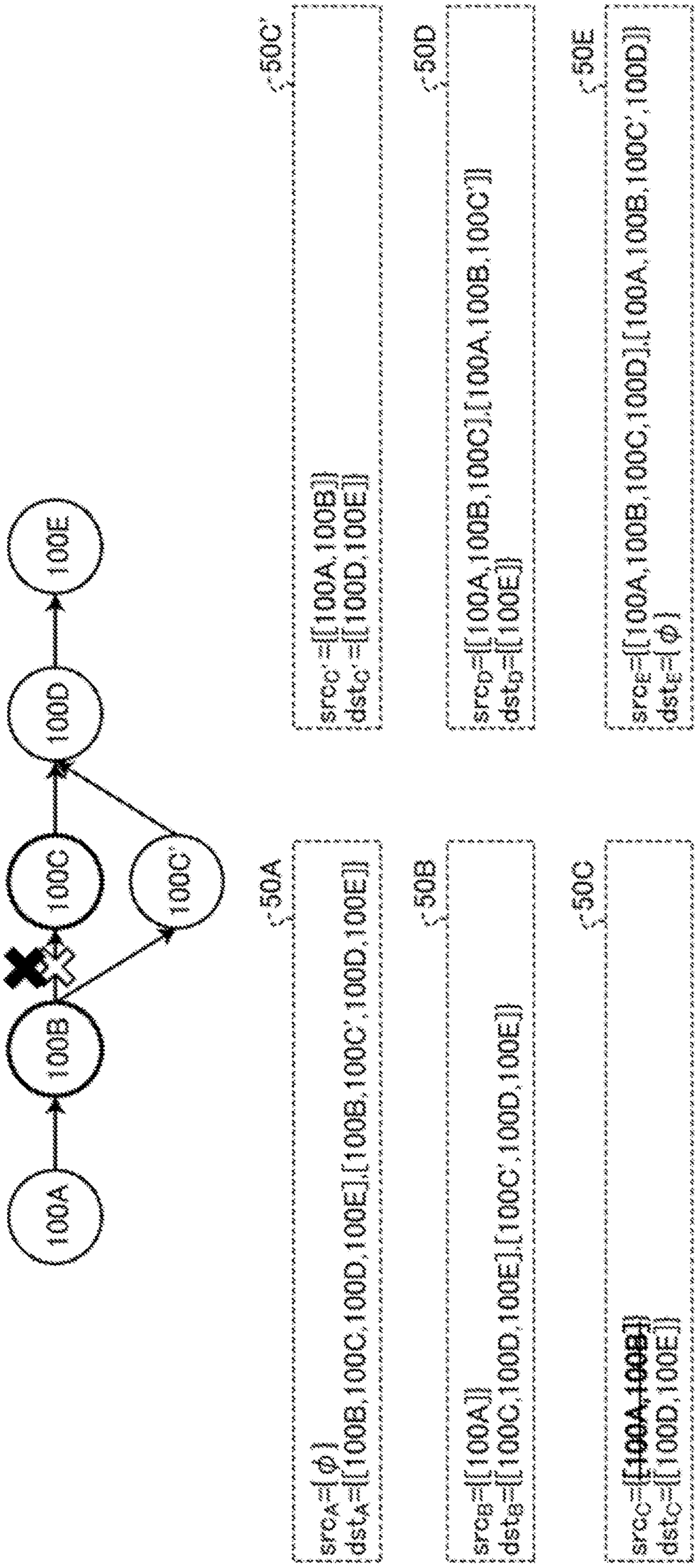
FIG. 29 is a diagram (3) for explaining the process at the time of transmission cancellation.

The description proceeds to FIG. 29. Upon reception of the cancellation request, the node 100C deletes spath=[100A, 100B] from srcC.

Figure 30:
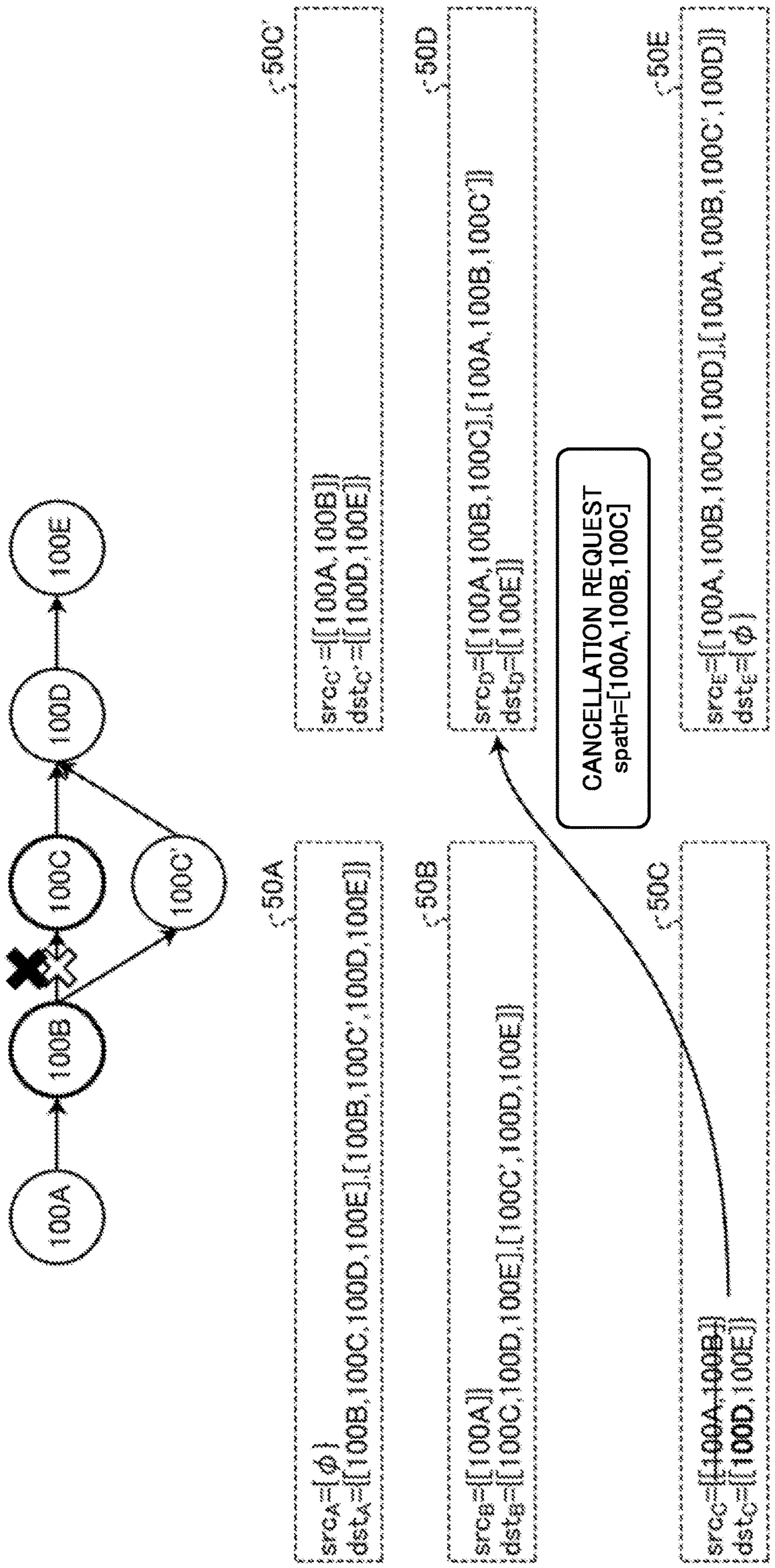
FIG. 30 is a diagram (4) for explaining the process at the time of transmission cancellation.

The description proceeds to FIG. 30. The node 100C defines spath=[100A, 100B, 100C] obtained by adding 100C to the end of the individual elements of spath. The node 100C transmits a cancellation request "spath=[100A, 100B, 100C]" to the node 100D.

Figure 31:
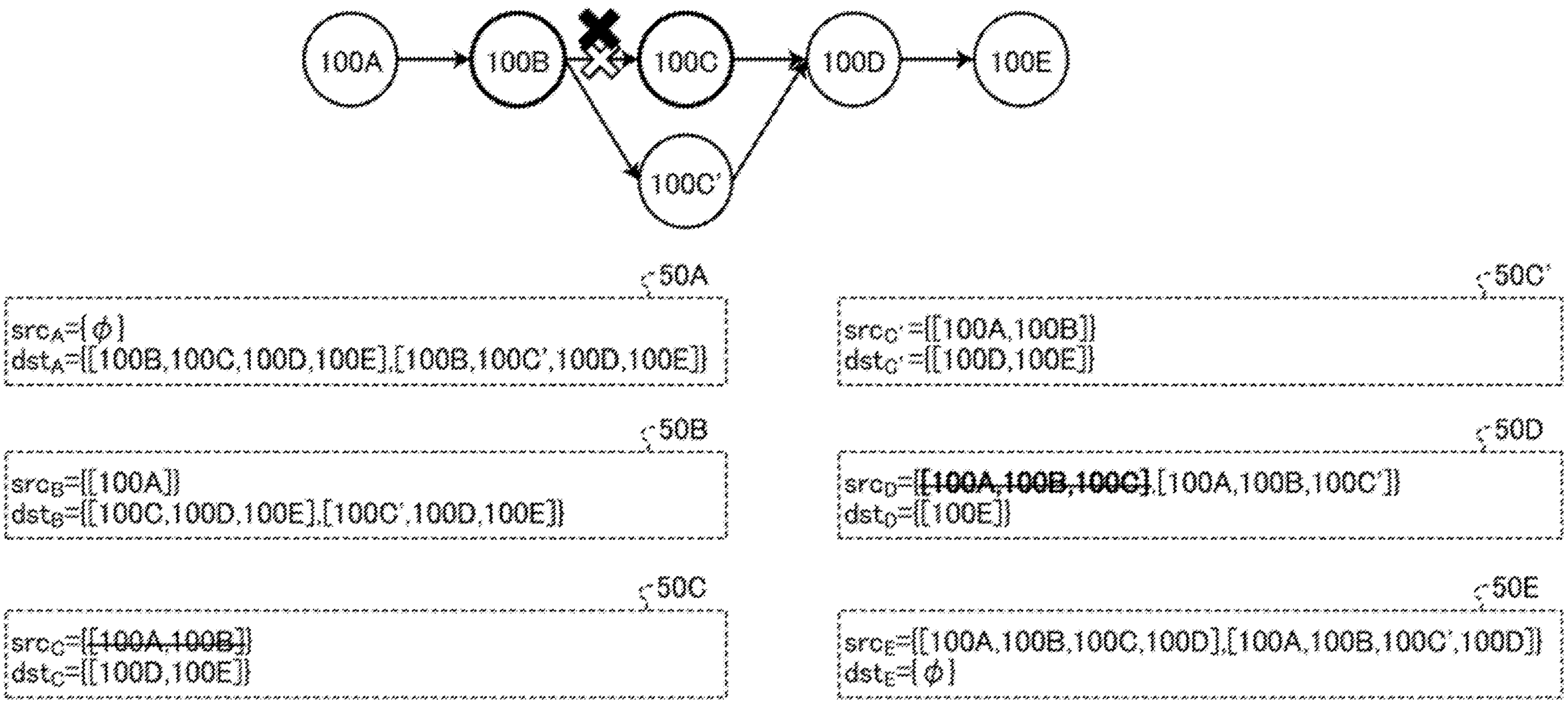
FIG. 31 is a diagram (5) for explaining the process at the time of transmission cancellation.

The description proceeds to FIG. 31. Upon reception of the cancellation request, the node 100D deletes spath=[100A, 100B, 100C] from srcD.

Figure 32:
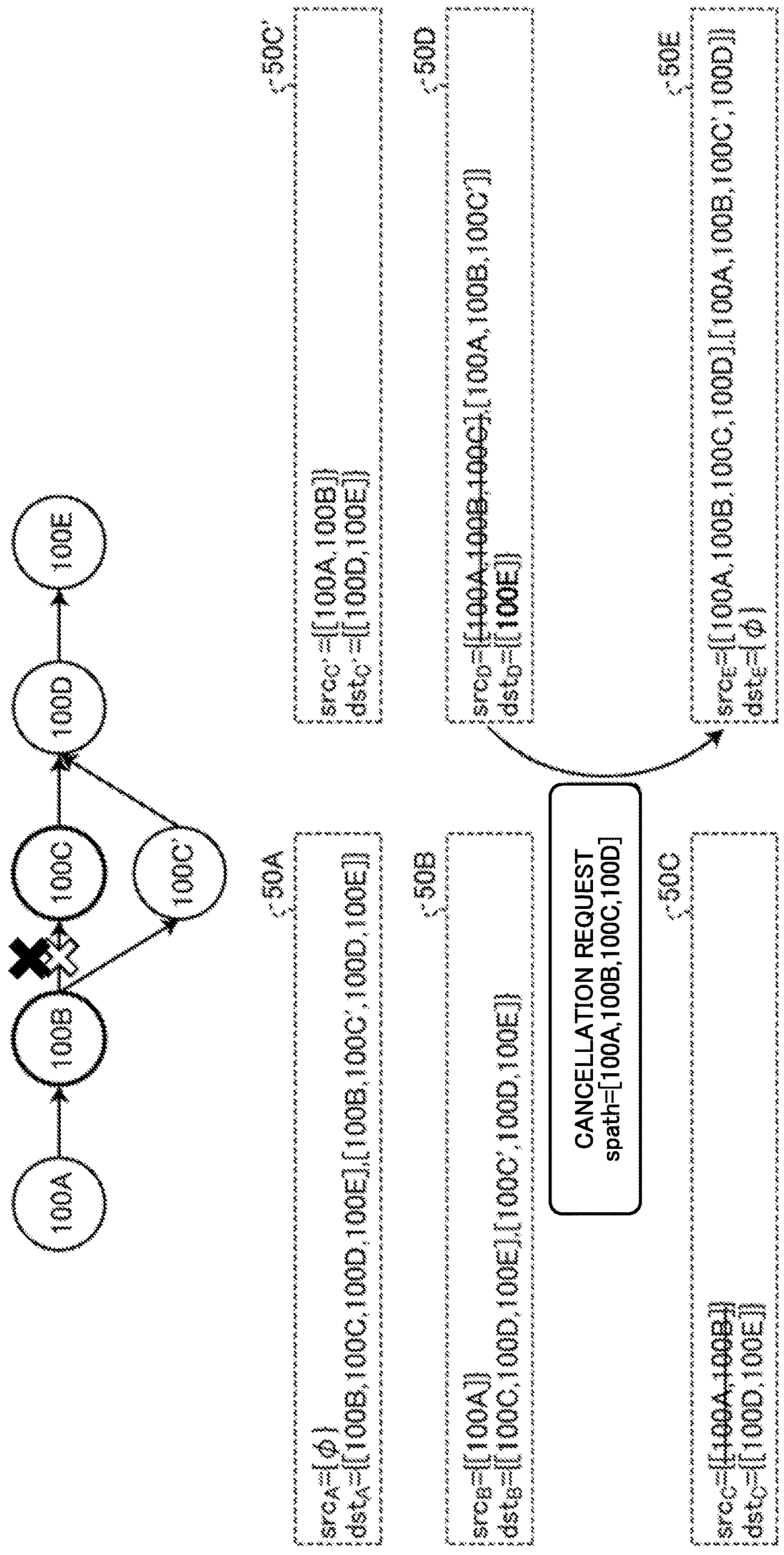
FIG. 32 is a diagram (6) for explaining the process at the time of transmission cancellation.

The description proceeds to FIG. 32. The node 100D defines spath=[100A, 100B, 100C, 100D] obtained by adding 100D to the end of the individual elements of spath. The node 100D transmits a cancellation request "spath=[100A, 100B, 100C, 100D]" to the node 100E.

Figure 33:
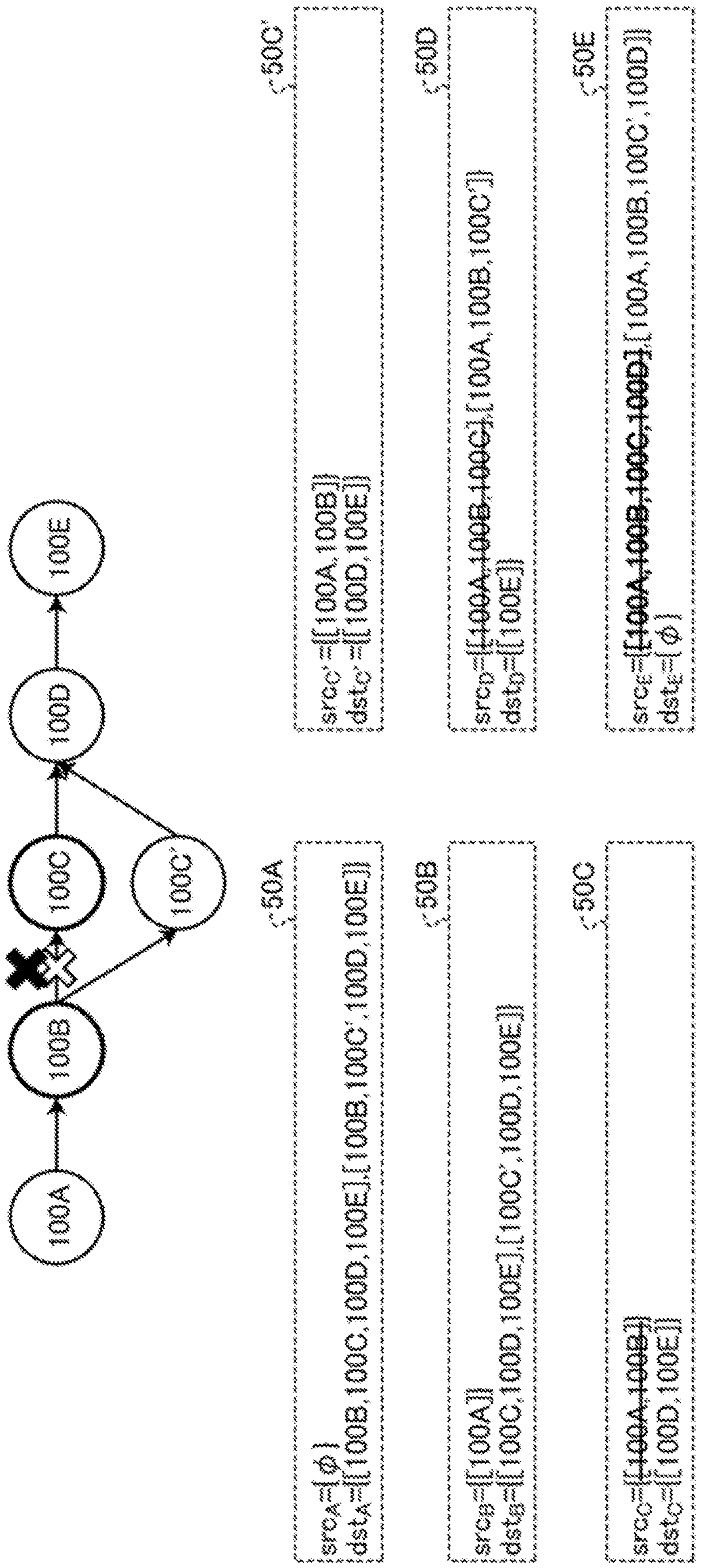
FIG. 33 is a diagram (7) for explaining the process at the time of transmission cancellation.

The description proceeds to FIG. 33. Upon reception of the cancellation request, the node 100E deletes spath=[100A, 100B, 100C, 100D] from srcE.

Figure 34:
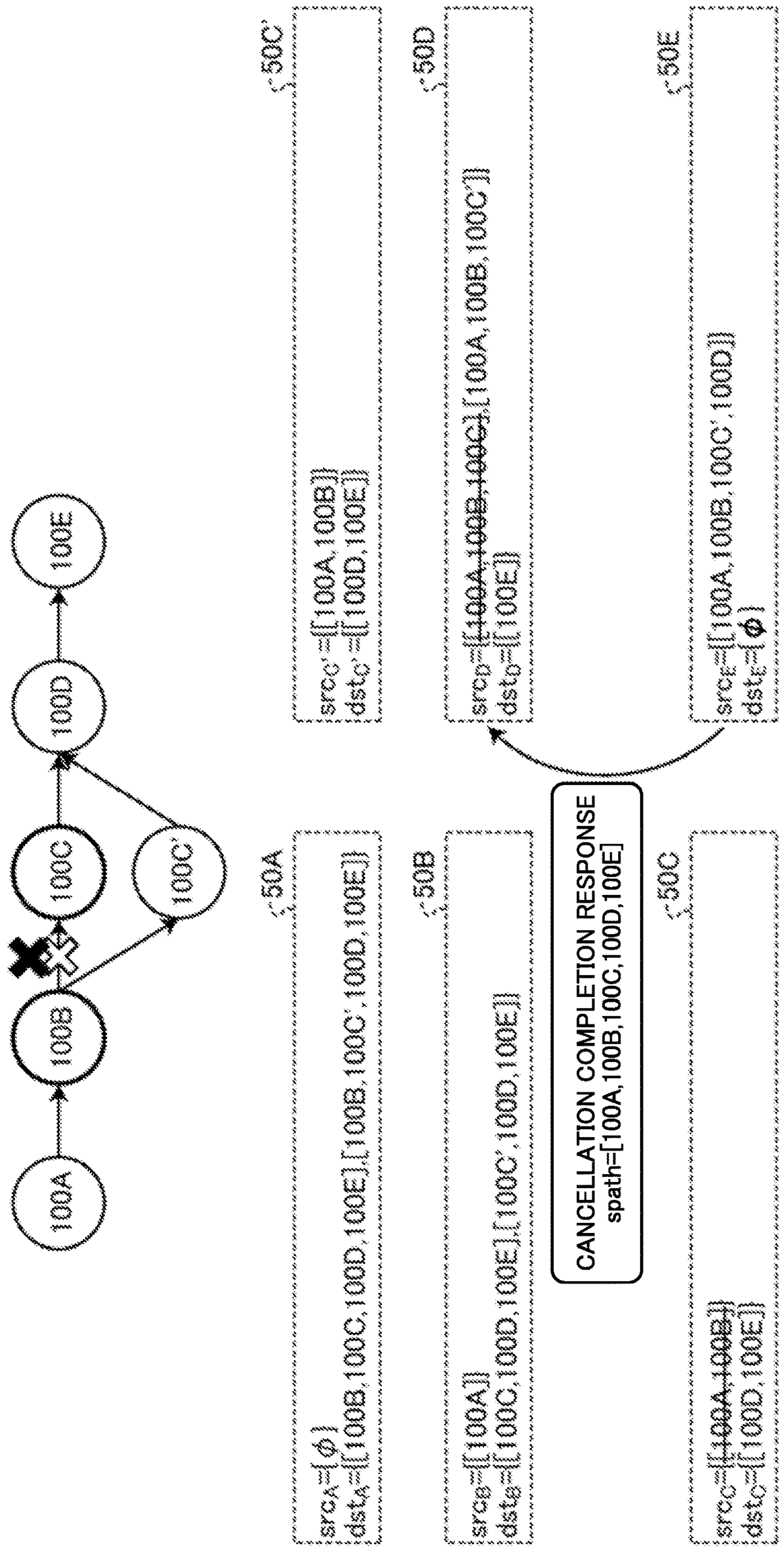
FIG. 34 is a diagram (8) for explaining the process at the time of transmission cancellation.

The description proceeds to FIG. 34. The node 100E defines spath=[100A, 100B, 100C, 100D, 100E] obtained by adding 100E to the end of the individual elements of spath. Since dstE is an empty set, the node 100E transmits a cancellation completion response "spath=[100A, 100B, 100C, 100D, 100E]" to the node 100D.

Figure 35:
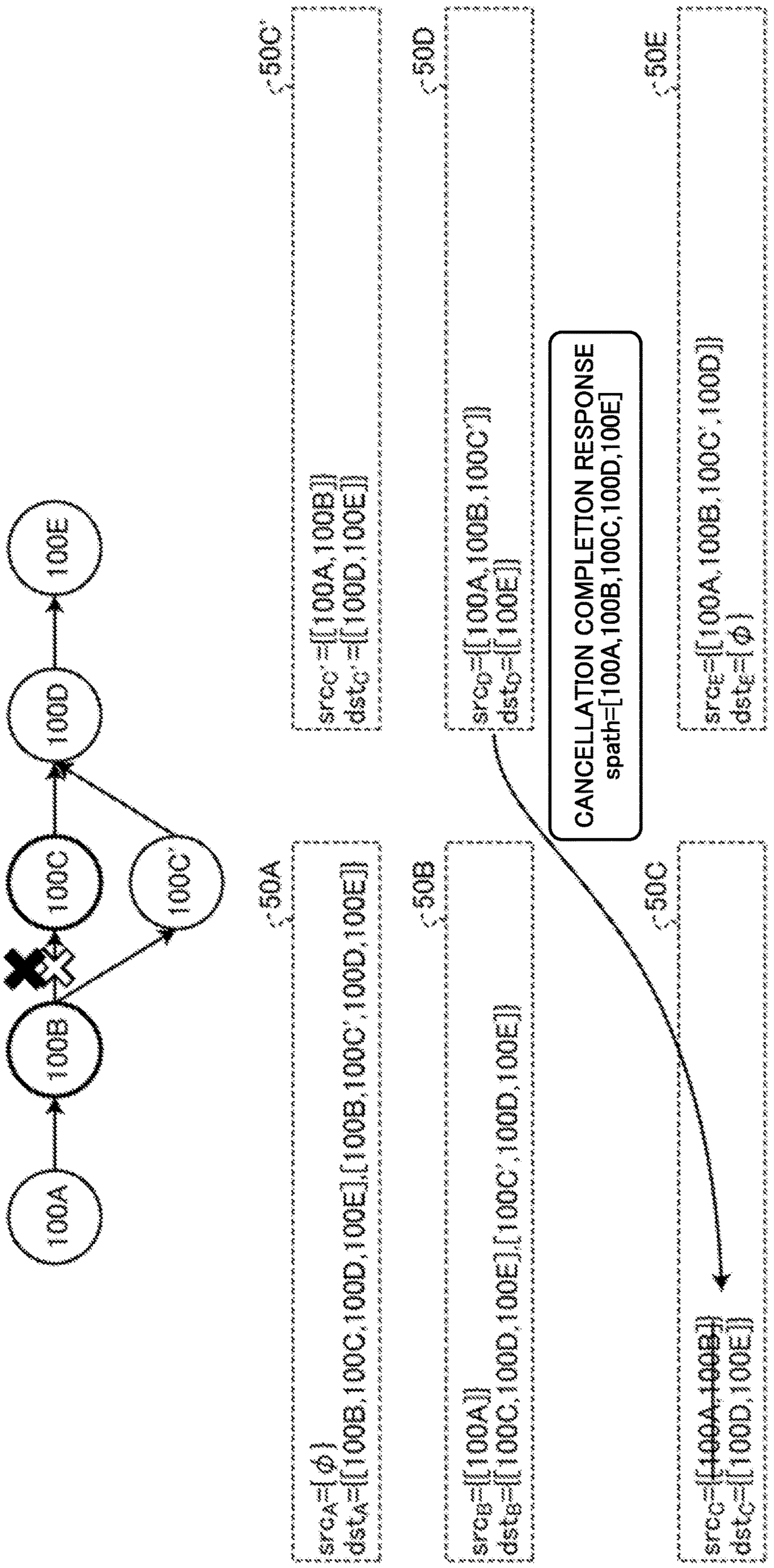
FIG. 35 is a diagram (9) for explaining the process at the time of transmission cancellation.

The description proceeds to FIG. 35. Upon reception of the cancellation completion response "spath=[100A, 100B, 100C, 100D, 100E]", the node 100D transmits the cancellation completion response to the node 100C.

Figure 36:
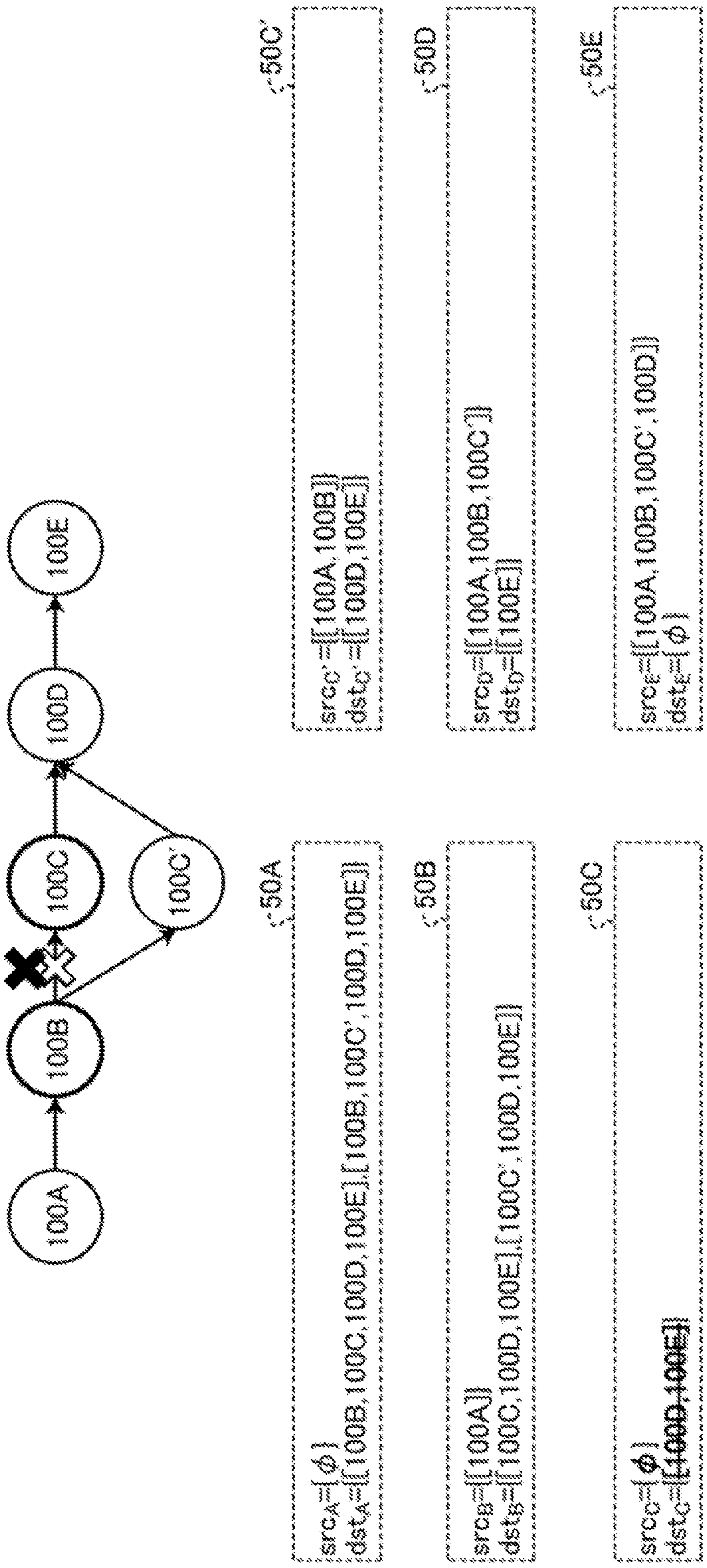
FIG. 36 is a diagram (10) for explaining the process at the time of transmission cancellation.

The description proceeds to FIG. 36. Upon reception of the cancellation completion response "spath=[100A, 100B, 100C, 100D, 100E]", the node 100C deletes the element from dstC.

Figure 37:
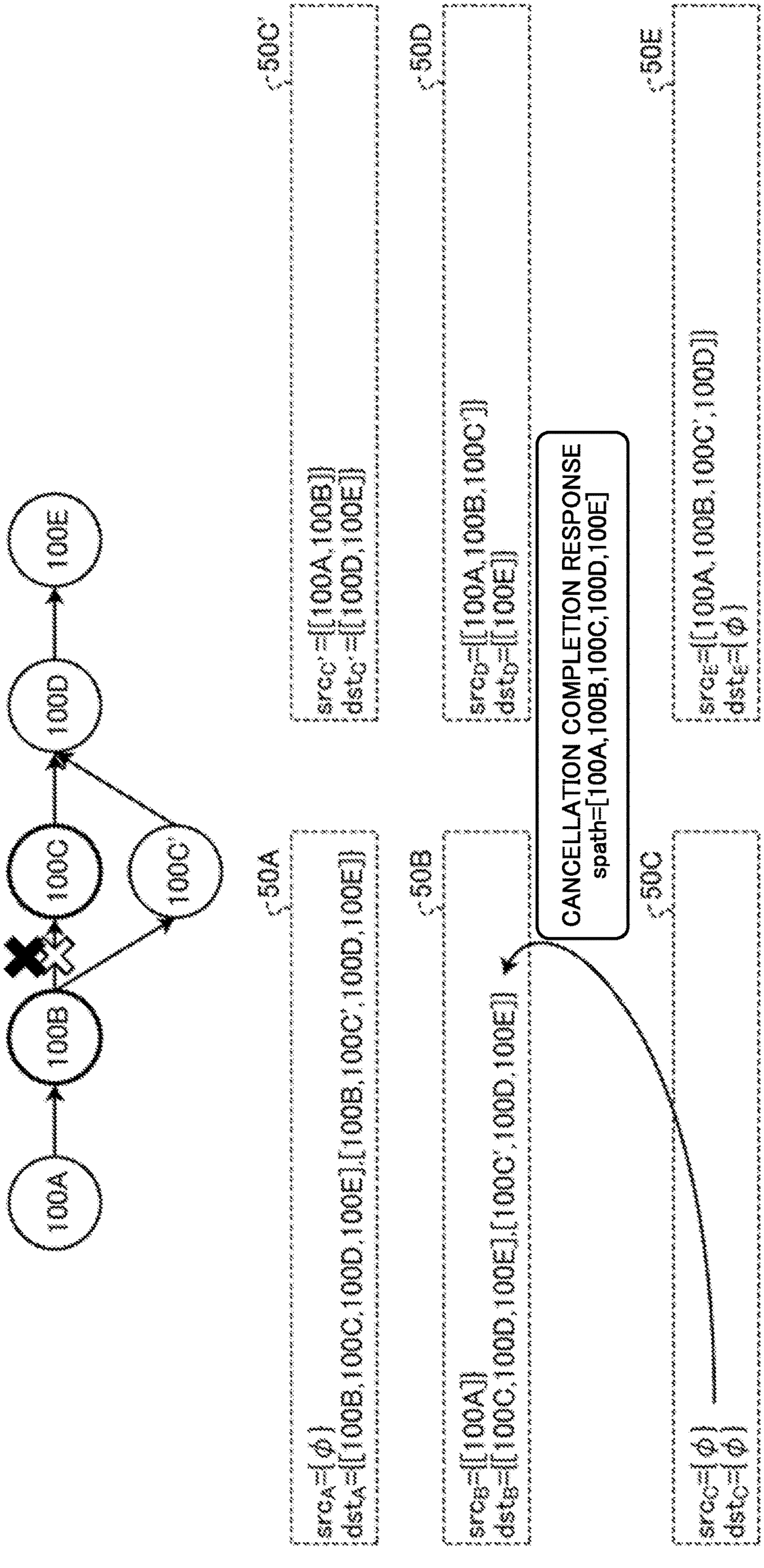
FIG. 37 is a diagram (11) for explaining the process at the time of transmission cancellation.

The description proceeds to FIG. 37. The node 100C transmits the cancellation completion response "spath=[100A, 100B, 100C, 100D, 100E]" to the node 100B.

Figure 38:
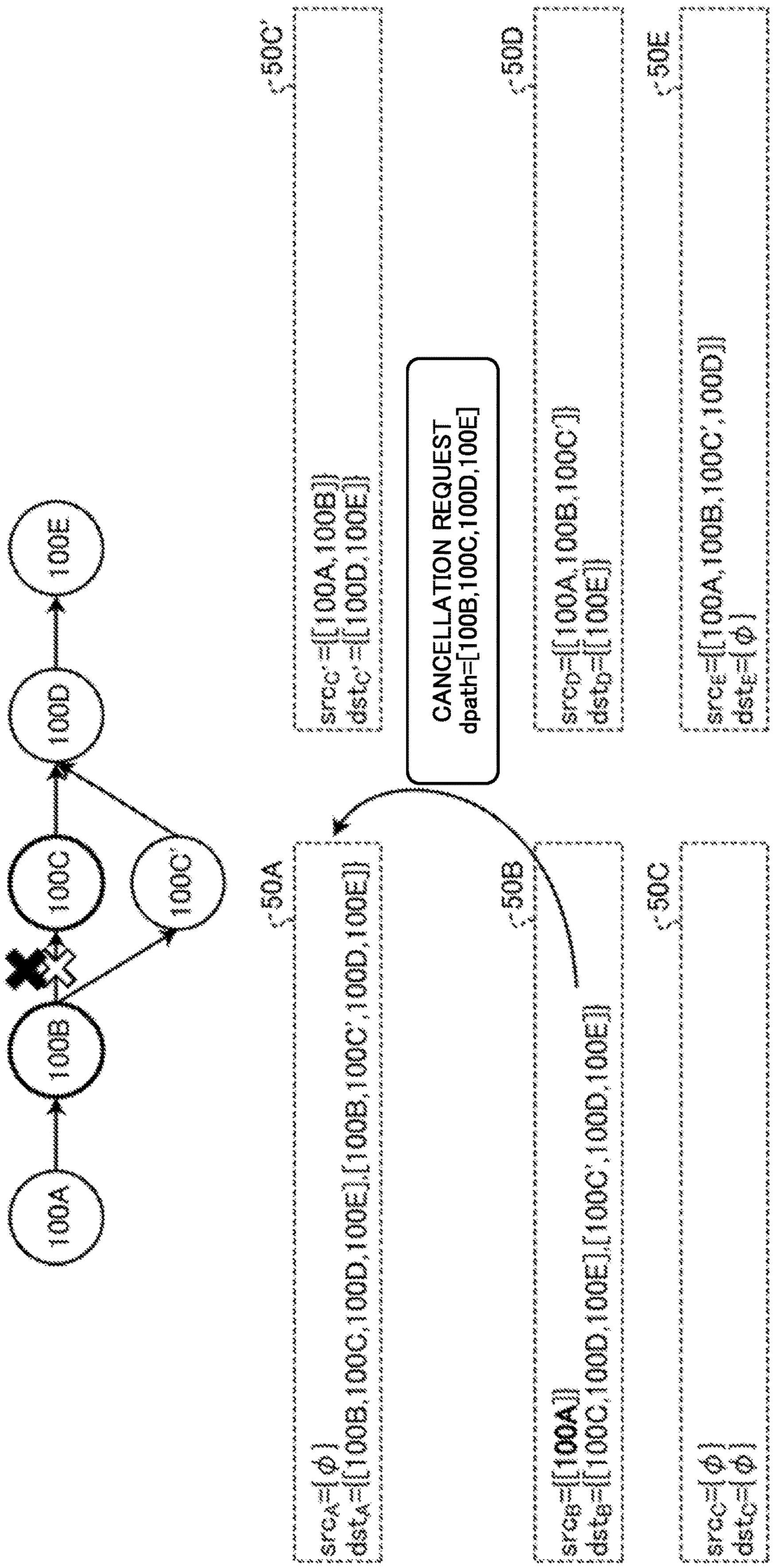
FIG. 38 is a diagram (12) for explaining the process at the time of transmission cancellation.

The description proceeds to FIG. 38. Upon reception of the cancellation completion response "spath=[100A, 100B, 100C, 100D, 100E]", the node 100B defines, as dpath, a set of elements obtained by removing srcB from the top of the individual elements of spath. The node 100B transmits a cancellation request "dpath=[100B, 100C, 100D, 100E]" to the node 100A.

Figure 39:
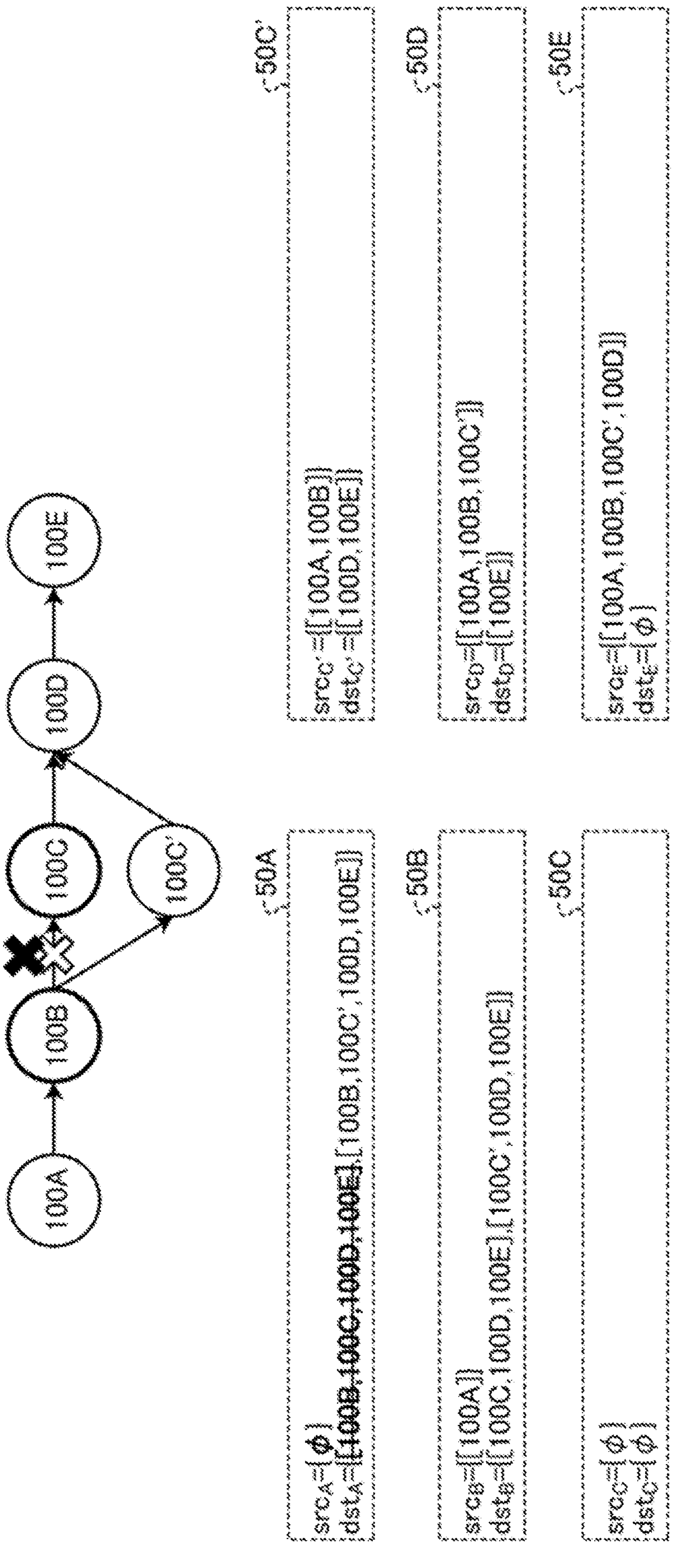
FIG. 39 is a diagram (13) for explaining the process at the time of transmission cancellation.

The description proceeds to FIG. 39. Upon reception of the cancellation request "dpath=[100B, 100C, 100D, 100E] ", the node 100A deletes dpath=[100B, 100C, 100D, 100E] from dstA.

Here, although illustration is omitted in FIG. 39, in a case other than srcA={φ}, the node 100A performs the following process. The node 100A transmits a cancellation request "dpath=[100A, 100B, 100C, 100D, 100E]" obtained by adding 100A to the top of the individual elements of dpath to the node at the end of srcA. If a cancellation completion response is returned from the node at the end of srcA, the node 100A deletes 100A from the top of dpath, and deletes dpath from dstA.

Figure 40:
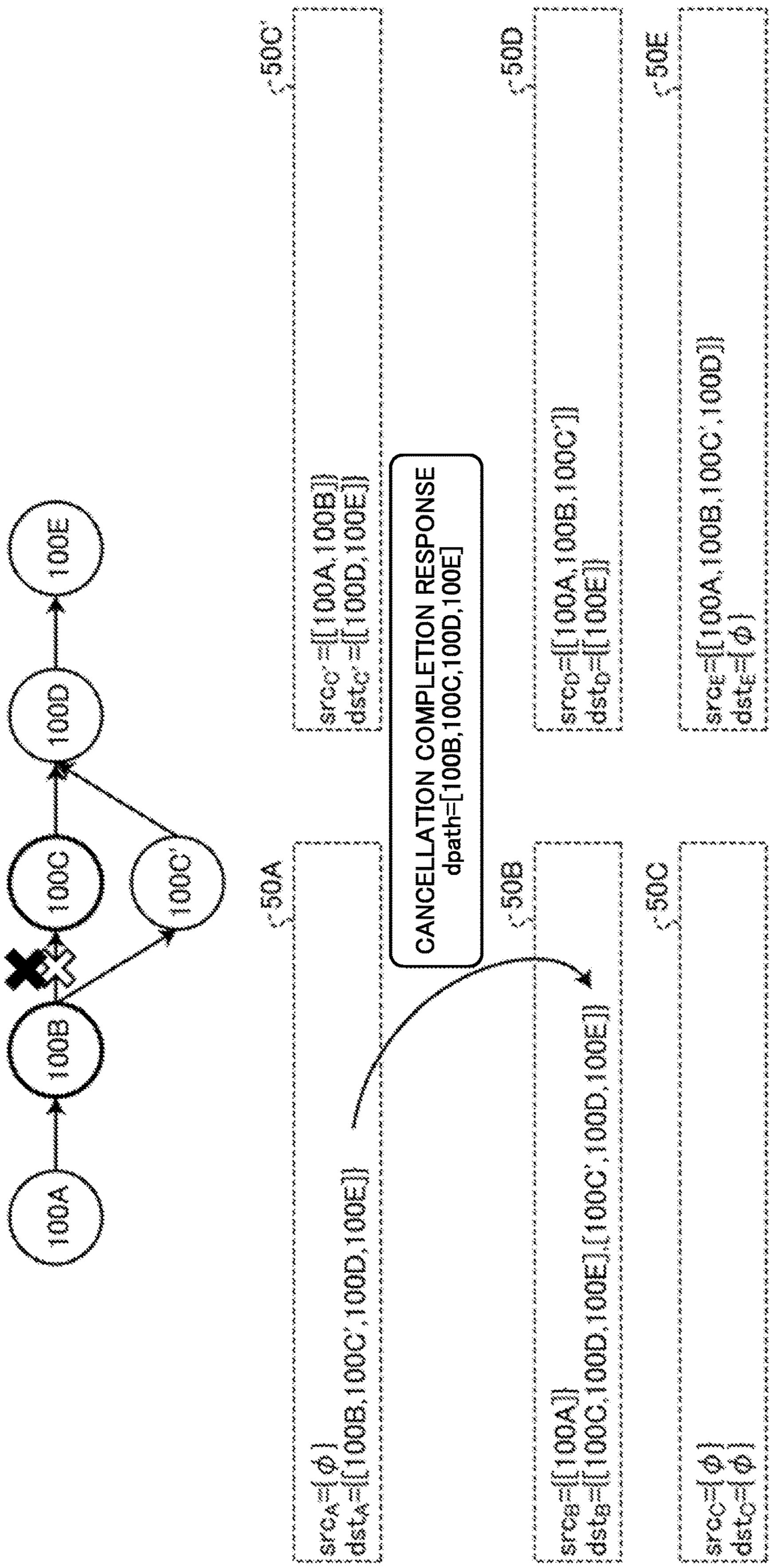
FIG. 40 is a diagram (14) for explaining the process at the time of transmission cancellation.

The description proceeds to FIG. 40. Since srcA={cp} is satisfied, the node 100A transmits a cancellation completion response "dpath=[100B, 100C, 100D, 100E]" to the node 100B.

Figure 41:
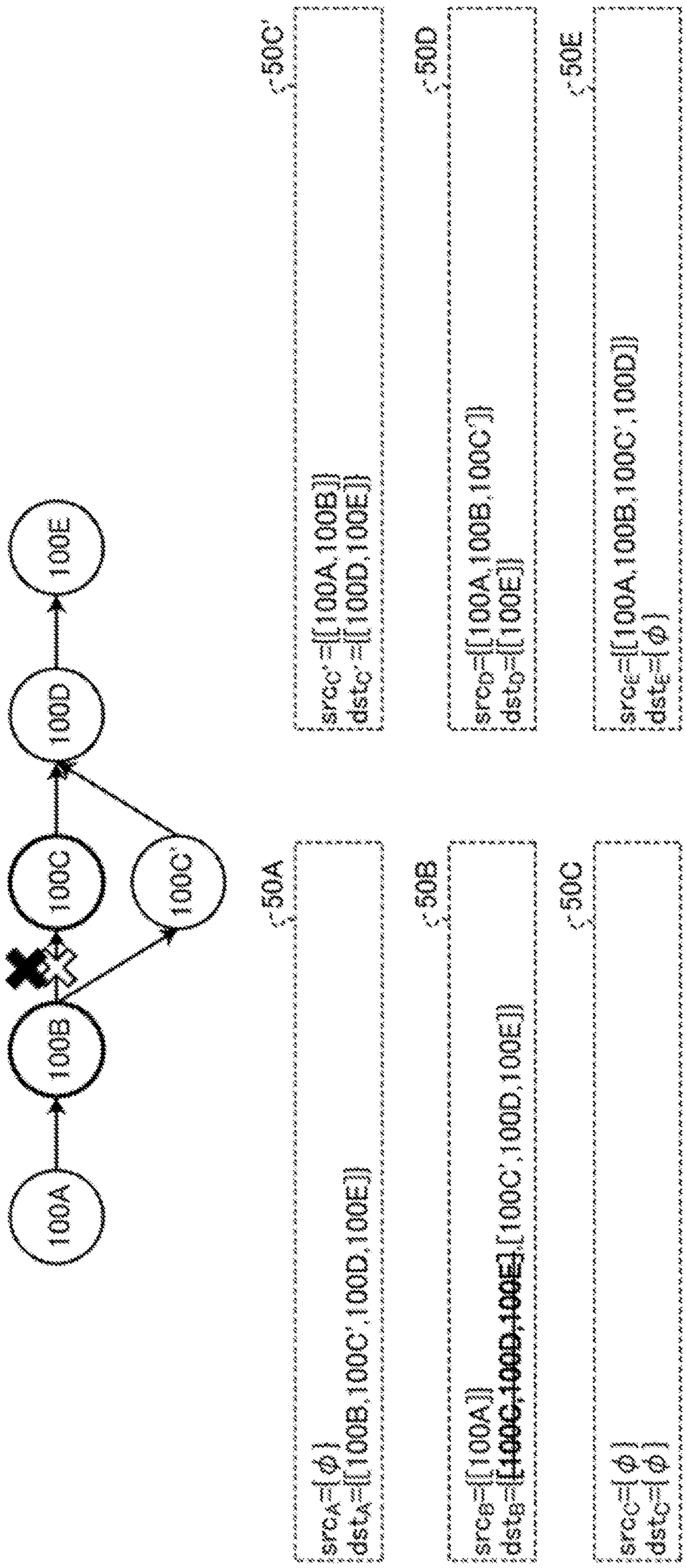
FIG. 41 is a diagram (15) for explaining the process at the time of transmission cancellation.

The description proceeds to FIG. 41. Upon reception of the cancellation completion response "dpath=[100B, 100C, 100D, 100E]", the node 100B defines dpath=[100C, 100D, 100E] obtained by removing 100B from the top of the individual elements of dpath. The node 100B removes dpath=[100C, 100D, 100E] from dstB.

Figure 42:
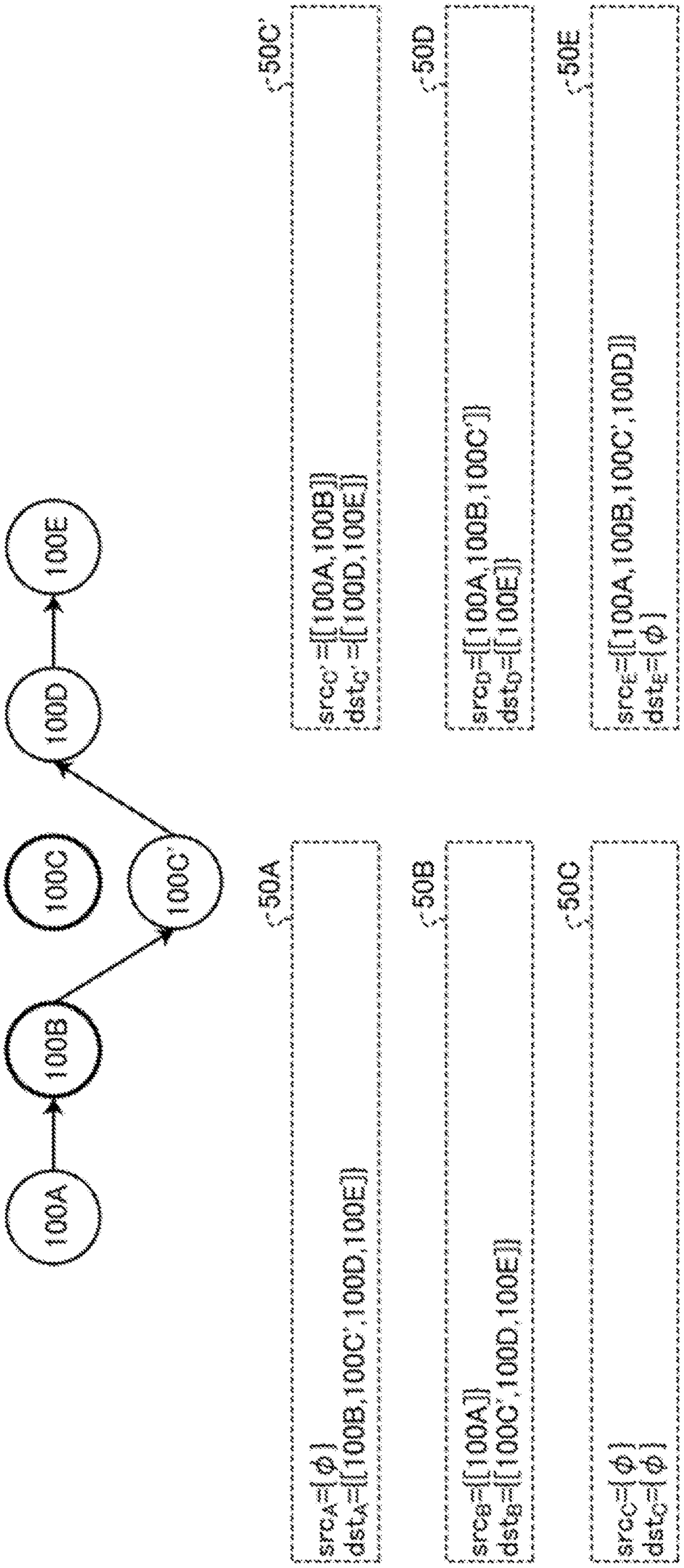
FIG. 42 is a diagram (16) for explaining the process at the time of transmission cancellation.

The description proceeds to FIG. 42. When the series of processes by the node 100B canceling the data transmission to the node 100C, the management information 50A and 50B retain the information illustrated in FIG. 42. As a result, the node 100*i* is enabled to appropriately update the distribution source list and the distribution destination list when data transmission cancellation occurs.

Figure 43:
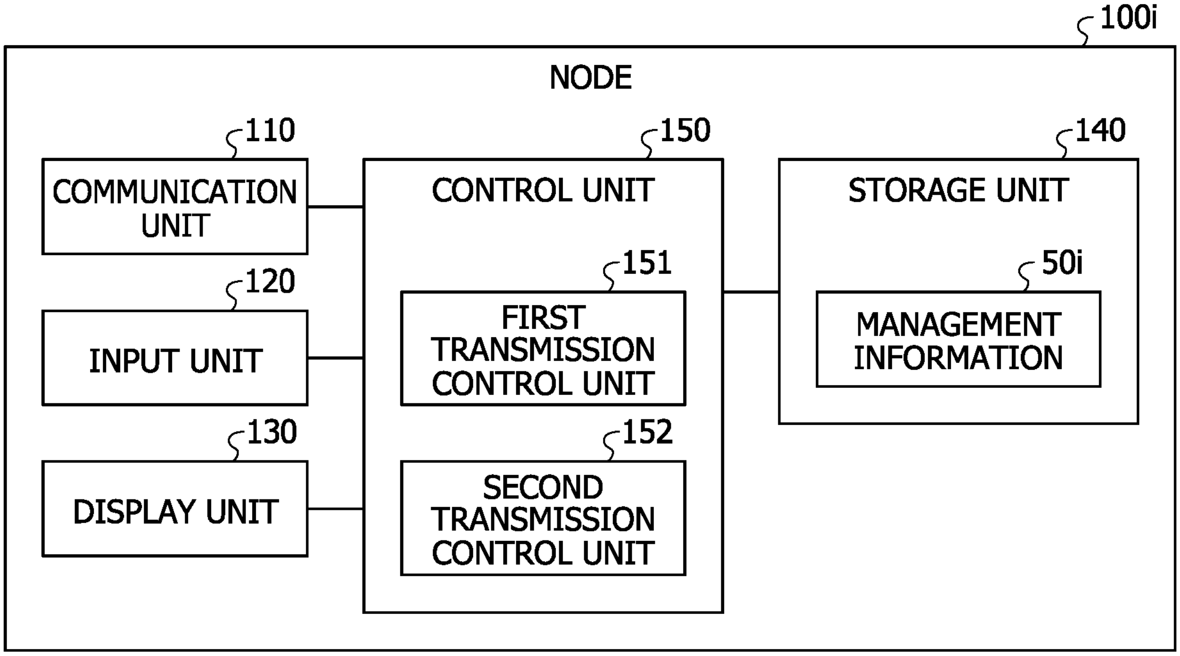
FIG. 43 is a functional block diagram illustrating a node configuration according to the present embodiment.

Next, an exemplary configuration of the node 100*i* according to the present embodiment that performs the processes described above will be described. The node 100*i* corresponds to any one node of the nodes 100A to 100E illustrated in FIG. 1 and the like. FIG. 43 is a functional block diagram illustrating a node configuration according to the present embodiment. As illustrated in FIG. 43, the node 100*i* includes a communication unit 110, an input unit 120, a display unit 130, a storage unit 140, and a control unit 150.

The communication unit 110 executes data communication with an external device and the like via a network. The control unit 150 to be described later exchanges data with an external device via the communication unit 110.

The input unit 120 is an input device that inputs various types of information to the control unit 150 of the node 100*i*. The input unit 120 corresponds to a keyboard, a mouse, a touch panel, or the like.

The display unit 130 is a display device that displays information output from the control unit 150.

The storage unit 140 has the management information 50*i*. The storage unit 140 corresponds to a semiconductor memory element such as a random access memory (RAM) or a flash memory, or a storage device such as a hard disk drive (HDD).

The management information 50*i* stores the distribution source list srci and the distribution destination list dsti. FIG. 44 is a diagram illustrating an exemplary data structure of the management information. As illustrated in FIG. 44, the management information 50*i* associates data ID, the distribution source list srci, and the distribution destination list dsti.

The data ID is an identification number assigned to each data to be subject to the nth-order transmission, and is used to identify the distribution source list srci and the distribution destination list dsti of each node. For example, each of the individual distribution source lists srci and distribution destination lists dsti illustrated in FIGS. 6 to 23 and FIGS. 27 to 42 is associated with the same data ID.

The distribution source list srci is a set of lists of nodes that have been passed through from the most upstream node (e.g., node 100A) to the node 100*i*. The distribution destination list dsti is a set of lists of nodes to be passed through from the node 100*i* to the most downstream node (e.g., node 100E).

The control unit 150 includes a first transmission control unit 151 and a second transmission control unit 152. The control unit 150 is implemented by a central processing unit (CPU), a graphics processing unit (GPU), a hard-wired logic such as an application specific integrated circuit (ASIC) or a field programmable gate array (FPGA), or the like.

The first transmission control unit 151 executes the data transmission (Forward) from the upstream side to the downstream side described with reference to FIGS. 2 and 3. Furthermore, the first transmission control unit 151 executes the data transmission (Backward) from the downstream side to the upstream side described with reference to FIGS. 4 and 5. With the first transmission control unit 151 of each of the nodes 100A to 100E executing the processes of FIGS. 2 to 5, data of the management information 50A to 50E becomes the data illustrated in FIG. 23, whereby the nodes 100A to 100E are enabled to correctly grasp the data distribution source and the data distribution destination.

For example, in a case where the first transmission control unit 151 receives an update request in which a distribution source list of the upstream adjacent node is set, it updates the distribution source list based on the update request, generates a new update request based on the updated distribution source list, and transmits the new update request to the downstream adjacent node.

In a case where the first transmission control unit 151 receives an update completion response in which a distribution destination list of the downstream adjacent node is set, it updates the distribution destination list based on the update completion response. Note that, in a case where the distribution destination list is an empty set, the first transmission control unit 151 transmits an update completion response to the upstream adjacent node.

Other specific processing procedures related to the first transmission control unit 151 correspond to the processing procedures illustrated in FIGS. 2 to 5.

The second transmission control unit 152 executes the processes at the time of transmission cancellation described with reference to FIGS. 24 to 26. With the second transmission control unit 152 of each of the nodes 100A to 100E executing the processes of FIGS. 24 to 26, data of the management information 50A to 50E becomes the data illustrated in FIG. 42, whereby the distribution source list and the distribution destination list may be appropriately updated when data transmission cancellation occurs.

For example, in a case where the second transmission control unit 152 receives a cancellation request, it deletes the identification information list of the node of the cancellation request from the distribution source list, generates a new cancellation request in which the identification information of its own node is set at the end of the cancellation request list, and transmits the new cancellation request to a downstream node.

In a case where the distribution destination list of its own node is not an empty set, the second transmission control unit 152 transmits the new cancellation request to the downstream adjacent node. In a case where the distribution destination list of its own node is an empty set, the second transmission control unit 152 transmits, to the upstream adjacent node, a cancellation completion response in which the identification information of its own node is set at the end of the cancellation request list.

In a case where the second transmission control unit 152 receives a cancellation completion response from the downstream adjacent node and the distribution source list of its own node is an empty set, it sets (deletes) the distribution destination list of its own node to an empty set.

Other specific processing procedures related to the second transmission control unit 152 correspond to the processing procedures illustrated in FIGS. 24 to 26.

Next, effects of the control system according to the present embodiment will be described. In a case where the node 100*i* of the control system receives an update request in which a distribution source list of the upstream adjacent node is set, it updates the distribution source list based on the update request, generates a new update request based on the updated distribution source list, and transmits the new update request to the downstream adjacent node. In a case where the node 100*i* receives an update completion response in which a distribution destination list of the downstream adjacent node is set, it updates the distribution destination list based on the update completion response. In a case where the distribution destination list is an empty set, the node 100*i* transmits an update completion response to the upstream adjacent node. As a result, the node 100*i* is enabled to correctly grasp the data distribution source and the data distribution destination.

In a case where the node 100*i* of the control system receives a cancellation request, it deletes the identification information list of the node of the cancellation request from the distribution source list, generates a new cancellation request in which the identification information of its own node is set at the end of the cancellation request list, and transmits the new cancellation request to a downstream node. In a case where the distribution destination list of its own node is not an empty set, the node 100*i* transmits the new cancellation request to the downstream adjacent node. In a case where the distribution destination list of its own node is an empty set, the node 100*i* transmits, to the upstream adjacent node, a cancellation completion response in which the identification information of its own node is set at the end of the cancellation request list. In a case where the node 100*i* receives a cancellation completion response from the downstream adjacent node and the distribution source list of its own node is an empty set, it deletes the distribution destination list of its own node. As a result, it becomes possible to appropriately update the distribution source list and the distribution destination list when data transmission cancellation occurs.

Figure 45:
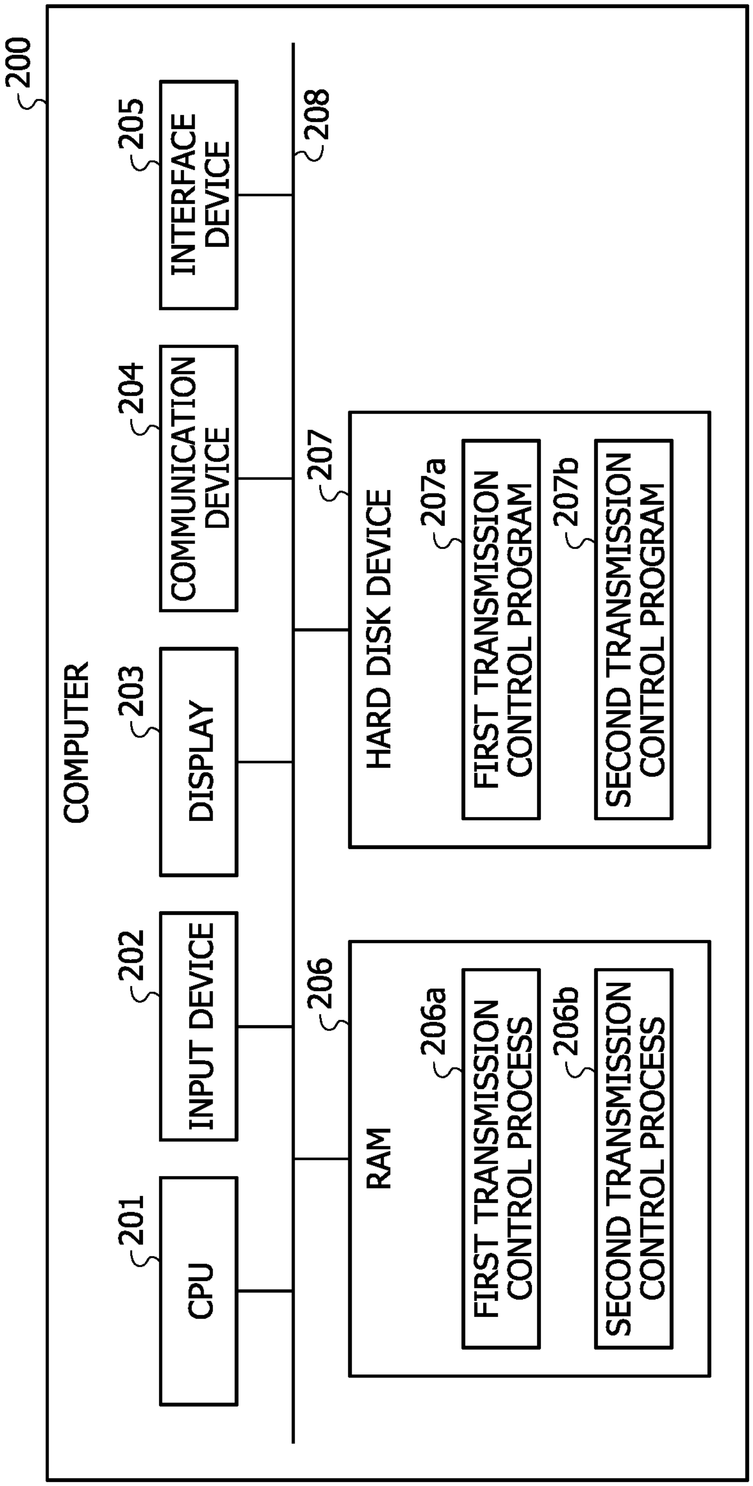
FIG. 45 is a diagram illustrating an exemplary hardware configuration of a computer that implements functions similar to those of the node according to the embodiment.
Figure 46:
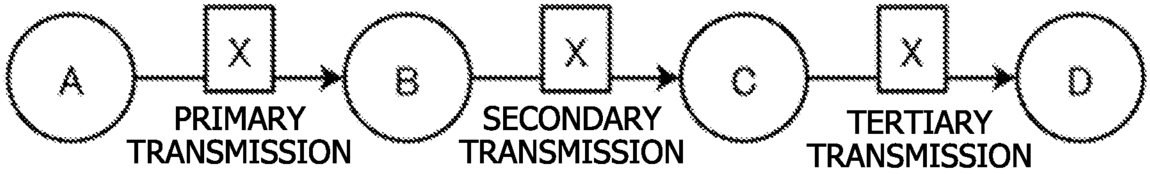
FIG. 46 is a diagram for explaining nth-order transmission.

Next, an exemplary hardware configuration of a computer that implements functions similar to those of the node 100*i* described above will be described. FIG. 45 is a diagram illustrating an exemplary hardware configuration of the computer that implements functions similar to those of the node according to the embodiment.

As illustrated in FIG. 45, a computer 200 includes a CPU 201 that executes various types of arithmetic processing, an input device 202 that receives data input from a user, and a display 203. Furthermore, the computer 200 includes a communication device 204 that exchanges data with another node, an external device, and the like via a wired or wireless network, and an interface device 205. Furthermore, the computer 200 includes a RAM 206 that temporarily stores various types of information, and a hard disk device 207. Additionally, each of the devices 201 to 207 is coupled to a bus 208.

The hard disk device 207 has a first transmission control program 207*a* and a second transmission control program 207*b*. Furthermore, the CPU 201 reads each of the programs 207*a* and 207*b*, and loads it into the RAM 206.

The first transmission control program 207*a* functions as a first transmission control process 206*a*. The second transmission control program 207*b* functions as a second transmission control process 206*b*.

Processing of the first transmission control process 206*a* corresponds to the processing of the first transmission control unit 151. Processing of the second transmission control process 206*b* corresponds to the processing of the second transmission control unit 152.

Note that each of the programs 207*a* and 207*b* may not necessarily be stored in the hard disk device 207 beforehand. For example, each of the programs may be stored in a "portable physical medium" to be inserted into the computer 200, such as a flexible disk (FD), a compact disc read only memory (CD-ROM), a digital versatile disc (DVD), a magneto-optical disk, or an integrated circuit (IC) card. Then, the computer 200 may read and execute each of the programs 207*a* and 207*b*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control system comprising a plurality of control devices configured to perform nth-order transmission, wherein each control device of the plurality of control devices includes:

a storage device configured to store, in relation to the plurality of control devices, a distribution source list that stores a list of the plurality of control devices to be passed through from a most upstream control device to the each control device and a distribution destination list that stores a list of the plurality of control devices to be passed through from the each control device to a most downstream control device; and a processor coupled to the storage device, the processor being configured to perform control processing including:

in a case where an update request in which a first distribution source list of a first control device being any one of the plurality of control devices is set is received, updating the distribution source list based on the update request, in a case where the distribution destination list is not an empty set, generating a new update request based on the updated distribution source list, and transmitting the new update request to a second control device being any one of the plurality of control devices in the distribution destination list other than the first control device and the each control device; and in a case where an update completion response in which a second distribution destination list of the second control device is set is received from the second control device, updating the distribution destination list based on the update completion response, wherein the control processing further includes transmitting the update completion response to the first control device when the distribution destination list is an empty set.

2. A control device operable as any one of a plurality of devices, the control device comprising:

a storage device configured to store, in relation to the plurality of control devices that performs nth-order transmission, a distribution source list that stores a list of the plurality of control devices to be passed through from a most upstream control device to the control device and a distribution destination list that stores a list of the plurality of control devices to be passed through from the control device to a most downstream control device; and a processor coupled to the storage device, the processor being configured to perform control processing including:

in a case where an update request in which a first distribution source list of a first control device being any one of the plurality of control devices is set is received, updating the distribution source list based on the update request, in a case where the distribution destination list is not an empty set, generating a new update request based on the updated distribution source list, and transmitting the new update request to a second control device being any one of the plurality of control devices in the distribution destination list other than the first control device and the control device; and in a case where an update completion response in which a second distribution destination list of the second control device is set is received from the second control device, updating the distribution destination list based on the update completion response, wherein the control processing further includes transmitting the update completion response to the first control device when the distribution destination list is an empty set.

3. The control device according to claim 2, wherein the control processing further includes:

in a case where a cancellation request indicating a request to cancel data transmission from a third control device to the control device is received, deleting a control device identification information list included in the cancellation request from the distribution source list, the cancellation request including the control device identification information list in which identification information of the third control device is added to an end of a third distribution source list of the third control device, the third control device being any one of the plurality of control devices; and generating a new cancellation request in which identification information of the control device is set at an end of the list of the cancellation request, to transmit the generated new cancellation request to a fourth control device of the plurality of control devices other than the third control device.

4. The control device according to claim 3, wherein the control processing further includes:

transmitting the new cancellation request to the fourth control device in a case where the distribution destination list of the control device is not an empty set; and in a case where the distribution destination list of the control device is the empty set, transmitting, to the third control device, a cancellation completion response in which the identification information of the control device is set at the end of the list of the cancellation request.

5. The control device according to claim 4, wherein the control processing further includes:

deleting the distribution destination list of the control device when the cancellation completion response is received from the fourth control device and the distribution source list of the control device is the empty set.

6. A control method implemented by each control device of a plurality of control devices, the each control device including a storage device configured to store, in relation to the plurality of control devices that performs nth-order transmission, a distribution source list that stores a list of the plurality of control devices to be passed through from a most upstream control device to the each control device and a distribution destination list that stores a list of the plurality of control devices to be passed through from the each control device to a most downstream control device, the control method comprising:

in a case where an update request in which a first distribution source list of a first control device being any one of the plurality of control devices is set is received, updating the distribution source list based on the update request, in a case where the distribution destination list is not an empty set, generating a new update request based on the updated distribution source list, and transmitting the new update request to a second control device being any one of the plurality of control devices in the distribution destination list other than the first control device and the each control device; and in a case where an update completion response in which a second distribution destination list of the second control device is set is received from the second control device, updating the distribution destination list based on the update completion response, wherein the control processing further includes transmitting the update completion response to the first control device when the distribution destination list is an empty set.

7. A non-transitory computer-readable recording medium storing a control program for causing each control device of a plurality of control devices to perform control processing, the each control device including a storage device configured to store, in relation to the plurality of control devices that performs nth-order transmission, a distribution source list that stores a list of the plurality of control devices to be passed through from a most upstream control device to the each control device and a distribution destination list that stores a list of the plurality of control devices to be passed through from the each control device to a most downstream control device, the control processing comprising:

in a case where an update request in which a first distribution source list of a first control device being any one of the plurality of control devices is set is received, updating the distribution source list based on the update request, in a case where the distribution destination list is not an empty set, generating a new update request based on the updated distribution source list, and transmitting the new update request to a second control device being a control device in the distribution destination list other than the first control device and the each control device; and in a case where an update completion response in which a second distribution destination list of the second control device is set is received from the second control device, updating the distribution destination list based on the update completion response, wherein the control processing further includes transmitting the update completion response to the first control device when the distribution destination list is an empty set.

* * * * *